(12) United States Patent
Trevisan et al.

(10) Patent No.: US 10,333,163 B2
(45) Date of Patent: Jun. 25, 2019

(54) SORBENT BED ASSEMBLY, FUEL CELL SYSTEM INCLUDING SAME, AND SYSTEMS AND DEVICES FOR LOADING AND TRANSPORTING SAME

(71) Applicant: BLOOM ENERGY CORPORATION, Sunnyvale, CA (US)

(72) Inventors: David Trevisan, San Jose, CA (US); Arne Ballantine, Palo Alto, CA (US); Bruno Caulk, San Jose, CA (US); Ross Parker, Santa Clara, CA (US); Gilbert Richards, San Jose, CA (US); Robert M. Hintz, San Jose, CA (US); Emma Campbell, Palo Alto, CA (US); Craig Metcho, San Francisco, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 387 days.

(21) Appl. No.: 15/155,583

(22) Filed: May 16, 2016

(65) Prior Publication Data

US 2017/0331133 A1    Nov. 16, 2017

(51) Int. Cl.
  *H01M 8/06* (2016.01)
  *H01M 8/0662* (2016.01)
  *B01D 53/04* (2006.01)

(52) U.S. Cl.
  CPC ...... *H01M 8/0687* (2013.01); *B01D 53/0423* (2013.01); *B01D 53/0446* (2013.01); *H01M 8/0675* (2013.01); *B01D 2256/16* (2013.01); *B01D 2256/24* (2013.01);

(Continued)

(58) Field of Classification Search
  None
  See application file for complete search history.

(56) References Cited

U.S. PATENT DOCUMENTS

| 7,063,732 | B2 * | 6/2006 | Katikaneni | B01D 53/48 585/822 |
| 7,713,649 | B2 | 5/2010 | Hickey et al. | |
| 8,440,362 | B2 | 5/2013 | Richards et al. | |

(Continued)

OTHER PUBLICATIONS

International Search Report and Written Opinion received in connection with international application No. PCT/US2015/010137; dated Apr. 30, 2015.

(Continued)

*Primary Examiner* — Wyatt P McConnell
(74) *Attorney, Agent, or Firm* — The Marbury Law Group PLLC

(57) ABSTRACT

A sorbent bed assembly of a fuel cell system, including a first sorbent bed, a second sorbent bed and at least one third sorbent bed, the second sorbent bed disposed between the first sorbent bed and the at least one third sorbent bed, a cover plate on the plurality of sorbent beds and configured to connect the sorbent beds to one another, a fuel inlet connector on the cover plate and configured to receive a fuel, a manifold having a first fluid conduit configured to transport fuel between the first sorbent bed and at least one third sorbent bed, and a second fluid conduit configured to transport fuel between at least one third sorbent bed and the second sorbent bed, and a fuel outlet connector on the cover plate and configured to receive fuel that has passed through each of the sorbent beds.

14 Claims, 17 Drawing Sheets

(52) U.S. Cl.
CPC .................... *B01D 2257/30* (2013.01); *B01D 2259/40003* (2013.01); *B01D 2259/403* (2013.01); *B01D 2259/4145* (2013.01)

(56) References Cited

U.S. PATENT DOCUMENTS

| | | |
|---|---|---|
| 8,535,836 B2 | 9/2013 | Ballantine et al. |
| 9,190,693 B2 | 11/2015 | Sridhar et al. |
| 2007/0224472 A1 | 9/2007 | Fujita et al. |
| 2008/0289496 A1 | 11/2008 | Poshusta et al. |
| 2009/0029208 A1* | 1/2009 | Katikaneni ........ H01M 8/04447 429/410 |
| 2009/0197296 A1 | 8/2009 | Martin et al. |
| 2010/0216628 A1 | 8/2010 | Vanderspurt et al. |
| 2012/0189940 A1* | 7/2012 | Richards ................. H01M 8/06 429/471 |
| 2014/0272612 A1 | 9/2014 | Trevisan et al. |
| 2015/0194685 A1 | 7/2015 | Ballantine et al. |

OTHER PUBLICATIONS

U.S. Appl. No. 15/061,673, filed Mar. 4, 2016, Bloom.

* cited by examiner

SORBENT BED ASSEMBLY, FUEL CELL SYSTEM INCLUDING SAME, AND SYSTEMS AND DEVICES FOR LOADING AND TRANSPORTING SAME

FIELD

Aspects of the present invention provide an sorbent bed assembly, a fuel processor for a fuel cell system including an sorbent bed assembly, and systems and devices for loading, removing and/or transporting sorbent bed assemblies.

BACKGROUND

The reliability of fuel cell systems, such as a solid oxide fuel cell (SOFC) system, greatly depends on the presence and concentration of undesirable constituents in the fuel stream. Undesirable constituents, such as moisture, oxygen, siloxanes, and sulfur (including sulfur compounds), may degrade the fuel cell stack's performance and cause irreversible damage resulting in decrease efficiencies and costly replacement. Specifically, when using natural gas as a fuel, fuel cell systems require desulfurization. Passing fuel through desulfurizer sorbent beds is one way to remove sulfur and sulfur compounds from fuel prior to use in a fuel cell.

However, the sorbent beds have a finite life and once the bed is exhausted, sulfur may pass through the sorbent bed without being removed and reach the fuel cell stack, causing permanent damage. Even if sorbent beds are replaced prior to exhaustion, there may be underutilized portions of the sorbent bed increasing the cost of sorbent bed replacement. Additionally, other undesirable constituents not filtered by the desulfurizer sorbent beds may cause damage to the fuel cell stack, shortening its operational life.

SUMMARY

An embodiment includes a sorbent bed assembly of a fuel cell system, the sorbent bed assembly includes a plurality of sorbent beds configured to purify a fuel, the plurality of sorbent beds including a first sorbent bed, a second sorbent bed and at least one third sorbent bed, the second sorbent bed disposed between the first sorbent bed and the at least one third sorbent bed, a cover plate disposed on the plurality of sorbent beds and configured to connect the sorbent beds to one another, a fuel inlet connector disposed on the cover plate and configured to receive a fuel, a manifold having a first fluid conduit configured to transport fuel between the first sorbent bed and at least one third sorbent bed, and a second fluid conduit configured to transport fuel between at least one third sorbent bed and the second sorbent bed, and a fuel outlet connector disposed on the cover plate and configured to receive fuel that has passed through each of the sorbent beds of the plurality of sorbent beds.

Another embodiment includes a fuel processor for a power generating system including one or more fuel cells, the fuel processor including a housing, a first sorbent bed assembly in the housing, the first sorbent bed assembly including a first plurality of sorbent beds, a second sorbent bed assembly in the housing, the second sorbent bed assembly including a second plurality of sorbent beds, where the first and second sorbent bed assemblies are individually removable from the housing, an inlet manifold coupled to a fuel source, an outlet manifold coupled to at least one fuel cell of the power generating system, and at least one valve operable to selectively provide at least a first fuel flow state in which fuel from the inlet manifold flows through the first sorbent bed assembly and into the outlet manifold and fuel does not flow through the second sorbent bed assembly, and a second fuel flow state in which fuel from the inlet manifold flows through the second sorbent bed assembly and into the outlet manifold and fuel does not flow through the first sorbent assembly.

Another embodiment includes a system for loading and unloading a sorbent bed assembly to and from a cabinet of a fuel processor, the system including a beam assembly located within and attached to the cabinet, the beam assembly including a beam portion extending inside the cabinet and a mounting portion, a beam extension configured to be removably attached to the mounting portion to extend a length of the beam portion outside of the cabinet, and a trolley hoist configured to hoist the sorbent bed assembly to a raised position, and to translate along a length of the beam portion and the beam extension while supporting the fuel processing module in the raised position.

Another embodiment includes a cart for transporting a sorbent bed assembly of a fuel cell system, the cart including a body, at least one wheel connected to the body, a mast including a first end and an opposing second end that is hinged to body, a handle coupled to the mast, an arm having a first end that is hinged to the first end of the mast and an opposing second end, and an arm support extending from the mast to the arm, and configured to rotate the arm with respect to the mast.

Another embodiment includes a system for loading and unloading a sorbent bed assembly to and from a cabinet of a fuel processing system, the loading system including first guide elements disposed in the cabinet and configured to guide movement of the sorbent bed assembly in the cabinet, and a wheeled cart configured to transport the sorbent bed assembly, the cart including second guide elements configured to guide movement of the sorbent bed assembly on the cart, the second guide elements configured to mate with the first guide elements, such that the first and second guide elements are aligned with each other.

Another embodiment includes a pallet jack including a lifting portion and a pair of arms extending from the lifting portion and having roller assemblies disposed thereon, where each roller assembly includes a body configured to engage a portion of a pallet supporting a sorbent bed assembly, a plurality of rollers in an upper surface of the body and configured to roll the pallet onto and off of the body, and an extension rail beneath the body and extending beyond an end of the body, the extension rail configured to mate with an alignment feature in a cabinet of a fuel processor.

Another embodiment includes a cart for transporting an sorbent bed assembly for a fuel processor, the cart including a wheeled frame, a stage disposed above the wheeled frame, a lift connecting the frame and the stage, the lift configured to move the stage between a lowered position where the stage is disposed on the frame, and a raised position where the stage is spaced apart from the frame, at least one guide disposed on the stage and configured to guide the movement of a the sorbent bed assembly across the stage, and a translation mechanism configured to move the sorbent bed assembly across the stage.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
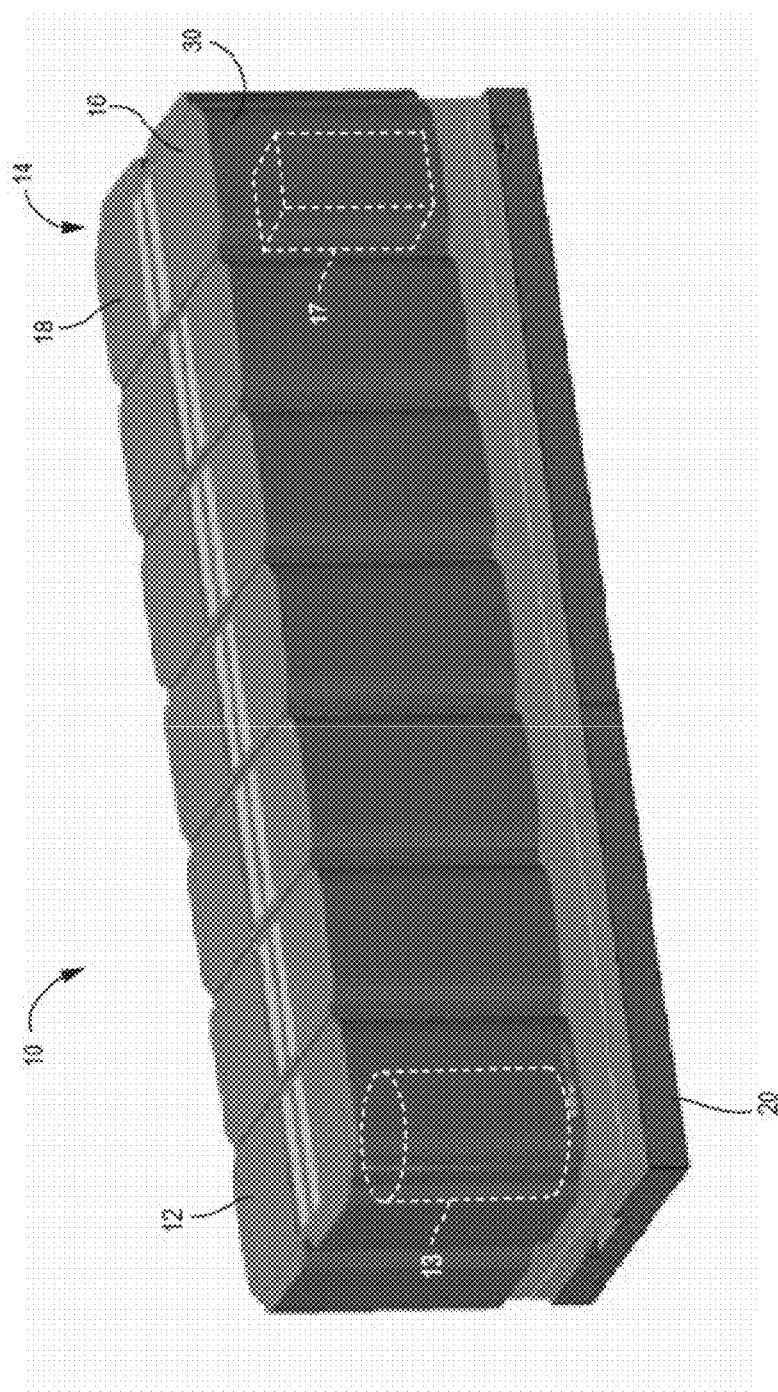
FIG. 1 illustrates a perspective view of a fuel cell system according to various embodiments of the present disclosure.

Referring to FIG. 1, a modular fuel cell system 10 is shown according to an exemplary embodiment. The system 10 may contain modules and components described in U.S. patent application Ser. No. 11/656,006, filed on Jan. 22, 2007, and incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The system 10 includes power modules 12, a fuel processing module 16, and power conditioning (i.e., electrical output) modules 18. In various embodiments, the power conditioning modules 18 are configured to deliver direct current (DC). In alternative embodiments, the power conditioning modules 18 are configured to deliver alternating current (AC). In these embodiments, the power condition modules 18 include a mechanism to convert DC to AC, such as an inverter. For example, the system enclosure may include any desired number of modules, such as 2-30 power modules, for example 3-12 power modules, such as 6-12 modules. FIG. 1 illustrates a system 10 containing six power modules 12 (one row of six modules stacked side to side), one fuel processing module 16, and one power conditioning module 18 on a common base 20. Each module 12, 16, 18 may comprise its own cabinet. Alternatively, as will be described in more detail below, modules 16 and 18 may be combined into a single input/output module 14 located in one cabinet. While one row of power modules 12 is shown, the system may comprise more than one row of modules 12. For example, the system may comprise two rows of power modules arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processor 17 is disposed in a cabinet 15 of the fuel processing module 16 and includes sorbent bed assemblies 80 (see FIG. 2). A sorbent bed assembly 80 includes at least one sorbent bed (i.e., absorption and/or adsorption bed) configured to remove undesirable constituents, such as sulfur and sulfur compounds or other impurities from a fuel stream. A sorbent bed assembly 80 may include, for example, a desulfurizer material. The fuel processor 17 may be accessed by a door 30 of the cabinet 15. The fuel processing module 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The fuel processing module 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels.

The fuel processor 17 is configured to reduce a fuel cell stack's exposure to undesirable constituents. The fuel processor 17 may include components for detecting the undesirable constituent downstream from a given sorbent bed, which indicates a breakthrough event (i.e., bed exhaustion). Once a breakthrough event is detected, a reserve capacity sorbent bed may be used to prevent more undesirable constituent from reaching the fuel cell stack (i.e., power generation module). Specifically, control systems may change the operation of the fuel cell system by altering fuel flow, utilizing a reserve sorbent bed, powering portions of the fuel cell system on/off, selecting different fuel sources, etc.

Additionally, a detection system may enable detection of undesirable constituents such as siloxanes, moisture, oxygen, sulfur (including sulfur compounds such as organosulfur compounds), and other fuel cell stack poisons. Sending data representative of undesirable constituent types to a database may be used to create an undesirable constituent map. Process controls may access the undesirable constituent type data and the undesirable constituent map to alter operations such as fuel flow, fuel source selection, and power to various portions of the fuel cell system. These alterations to the fuel cell system operation may prevent or reduce the exposure of fuel cell stack to the undesirable constituents the thereby improving efficiency and the operational life of fuel cell stack.

Conventionally, each sorbent bed is serviced as an individual part, and each sorbent bed is filled with the same absorbent or adsorbent materials to purify a fuel. Monitoring each sorbent bed may be difficult, as each sorbent bed needs to be accessible for service. In addition, mistakes may be made when replacing the individual sorbent beds and reconnecting fuel hoses.

In a fuel cell system, sorbent beds for removal of sulfur and other fuel cell contaminants may become exhausted, allowing the contaminants into the fuel cell stack (i.e., power generation module), causing irreversible damage to the stack. Although sorbent beds may be periodically replaced prior to exhaustion based on calendar estimations, changes in fuel sources or other variables that may alter sorbent bed exhaustion. Degradation of fuel cell performance may indicate that a primary sorbent bed is exhausted. Alternatively, undesirable constituent detectors downstream from an sorbent bed may also help determine when an sorbent bed is exhausted indicating that the sorbent bed needs to be serviced, thereby reducing a fuel cell stack's exposure to the undesirable constituents.

Traditional fuel processors use two sorbent beds connected in series. After a scheduled period or a determination that one sorbent bed is exhausted, both sorbent beds are replaced. This leads to under utilization of one or both sorbent beds and wasted cost in replacing them. Thus, detecting bed exhaustion may provide added cost benefits to a fuel cell system by fully using each sorbent bed in an sorbent bed assembly (i.e., fuel processing module).

According to various embodiments, the present inventors have provided a fuel processor that includes two or more sorbent bed assemblies connected to a fuel source. The sorbent bed assemblies may have a modular design, such that individual assemblies may be separately removed and replaced in the fuel processor. Each sorbent bed assembly may include multiple sorbent beds connected in series. One or more of the sorbent beds may be filled with different gas purification materials, based on the composition of a site fuel. As such, the capacity and service life of a fuel processor may be increased.

In addition, one sorbent bed assembly, which may be an exhausted sorbent bed assembly, may be isolated, while another sorbent bed remains in operation. As such, the fuel cell system may remain in operation when a sorbent bed is serviced. Various embodiments may enable "hot swapping" of sorbent bed assemblies, such that a first sorbent assembly may be removed from a fuel processor while fuel continues to flow through at least one additional sorbent bed assembly in the fuel processor. Further, the use of a sorbent bed assembly comprising multiple sorbent beds in within the same assembly/module may simplify maintenance, since such a configuration does not require the servicing of individual sorbent beds.

In some embodiments, sorbent bed exhaustion may be detected based on degradation of the fuel cell stack (i.e., power generation module) performance. Detection of degradation of fuel cell stack performance may include comparing the amount of fuel used by the fuel cell stack with the electrical potential difference (voltage) output of the fuel cell stack and/or monitoring a stack performance characteristic, such as fuel utilization, output power, etc. If the voltage output for a fuel cell stack drops below a threshold value (e.g., at least a 5% decrease in voltage) for a given fuel flow rate, then the fuel cell stack may detect that there is significant degradation, likely due to the fuel cell stack receiving undesirable constituents present in the fuel stream. A separate detector, such as a color change detector, electrical resistance detector, or an artificial nose, may detect bed exhaustion or additional undesirable constituents not filtered by the sorbent beds. These types of detection mechanisms may signal (e.g., directly or via a central controller) valves to divert flow from an exhausted bed to a non-exhausted bed, switch fuel sources, reduce fuel flow to the fuel cell stack, or stop fuel flow to the fuel cell stack to prevent damage to the fuel cell stack. Additionally, detectors, such as color change detectors, may send undesirable constituent data based on the color change to a color change database to create a color change map. Controls from the fuel cell system may alter the fuel cell system (e.g., divert fuel to a reserve sorbent bed, shut down the fuel cell stack, etc.), based on the undesirable constituent map and undesirable constituents currently detected.

FIGS. 2A-2D illustrate perspective and top plan views of an individual sorbent bed unit 82 that comprises a container 81 (e.g., canister) for housing a sorbent material, such as a desulfurizer material. FIG. 3 illustrates a sorbent bed assembly 80 that includes a plurality of sorbent bed units 82 such as shown in FIGS. 2A-2D. As shown in FIGS. 2A-2D, the container 81 of the sorbent bed unit 82 may have a generally rectangular prismatic body. In this example, the container 81 has a beveled edge 83, although in other embodiments the beveled edge 83 may be omitted. The container 81 may be relatively tall and narrow to fit in an upright standing position in a deep and narrow space, such as in a cabinet of a fuel processor.

Figure 2D:
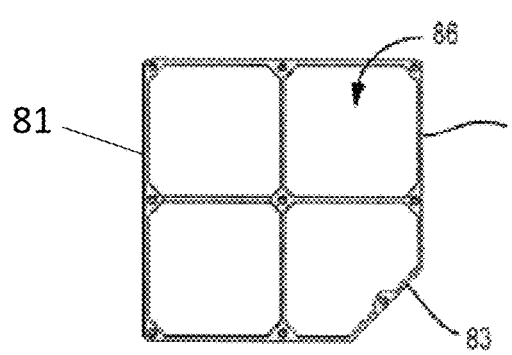
FIG. 2D is a top view of the sorbent bed unit of FIG. 2A, with the top removed to show internal chambers.
Figure 2B:
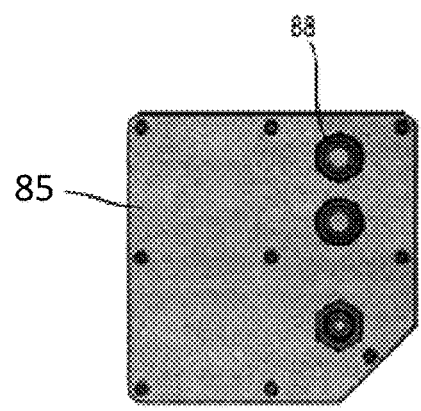
FIG. 2B is a top view of the sorbent bed unit of FIG. 2A.
Figure 2C:
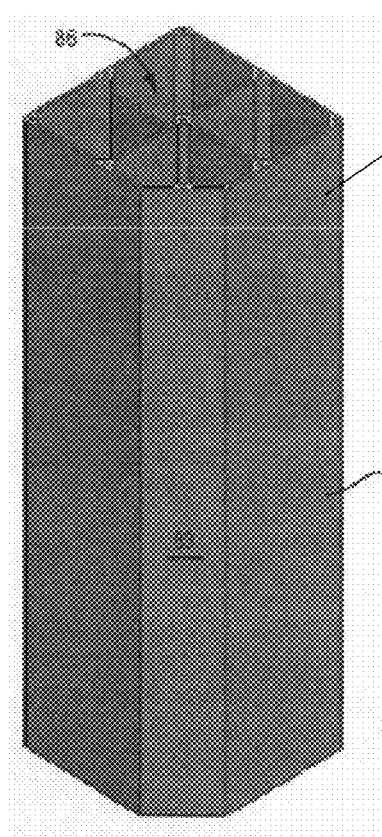
FIG. 2C is a perspective view of the sorbent bed unit of FIG. 2A with the top removed to show internal chambers.
Figure 3:
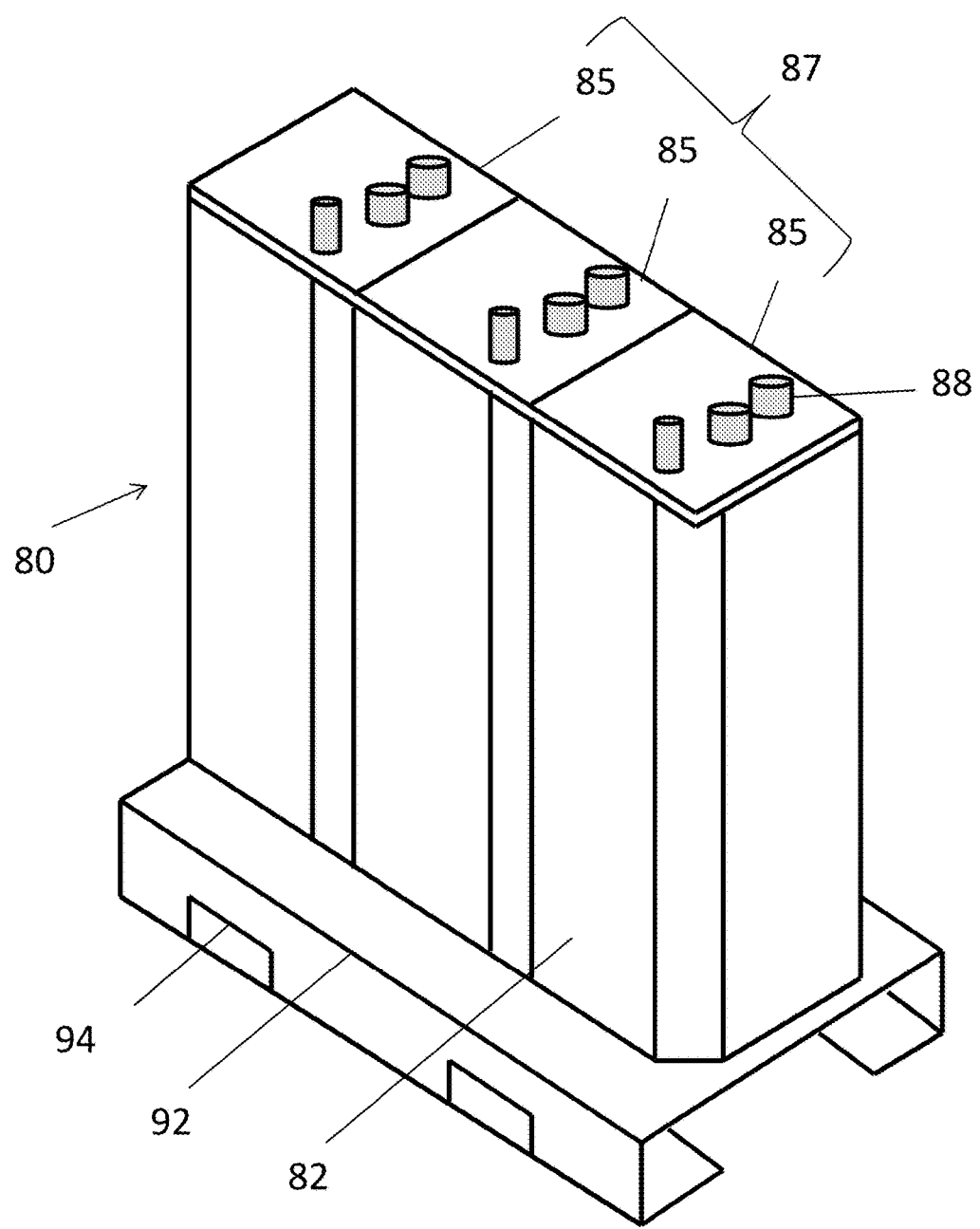
FIG. 3 illustrates a perspective view of sorbent bed assembly including a plurality of sorbent beds, according to various embodiments of the present disclosure.

The sorbent bed unit 82 may define internal channels 86 (e.g., subdivisions chambers, etc.), such as the four internal channels 86 shown in FIGS. 2C and 2D. The channels 86 may be filled with sorbent material (e.g., desulfurization material, not shown in FIGS. 2C and 2D) to define the sorbent bed. Fuel may pass through each of the channels 86 in the in fluid series. The sorbent bed unit 82 may a low cost design, and may be manufactured using extrusion methods. The relatively large length/diameter ratio of the channels 86 may increase material efficiency. The geometry of the channels 86 causes a moderate pressure drop and relatively uniform flow of the fuel inlet stream. Bulk mixing occurs at four points in each sorbent bed unit 82, which may reduce edge effects and bypass.

The sorbent bed unit 82 includes a top plate 85, upon which inputs and output (I/O) connections 88 for the sorbent bed unit 82 are provided. The I/O connections 88 may be swiveling leak-tight connections and in embodiments may be generally quick-connect connections. In the example of FIGS. 2A-2D, the top plate 85 covers a single sorbent bed unit 82. Alternately, a top or cover plate may be configured to cover a plurality of sorbent bend units 82 forming a sorbent bed assembly 80, as described below.

Figure 2A:
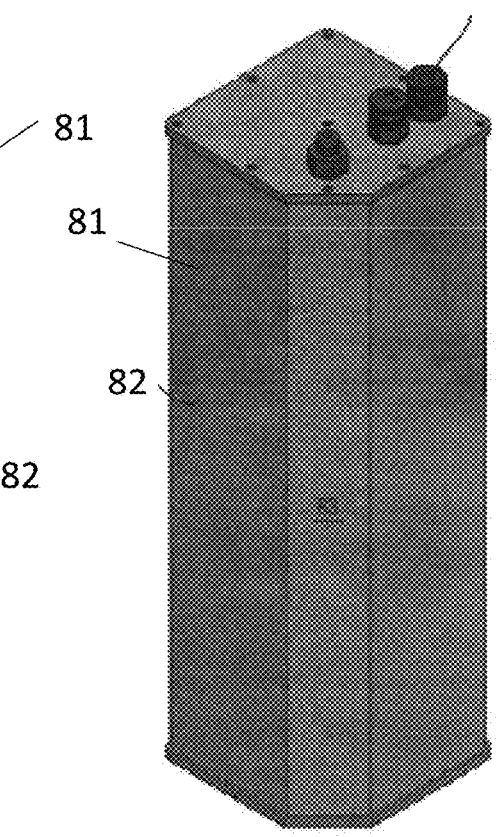
FIG. 2A illustrates a perspective view of a sorbent bed unit according to an embodiment.

FIG. 3 illustrates a sorbent bed assembly 80 that may be included in a fuel processor 17. The fuel processor 17 may include two sorbent bed assemblies 80, as discussed below. However, the fuel processor may include, three, four, or five sorbent bed assemblies, for example. Each sorbent bed assembly 80 includes multiple sorbent beds (e.g., sorbent bed units 82, as shown in FIGS. 2A-2C), each containing a desulfurization material, such as zeolite, etc. According to some embodiments, each sorbent bed unit 82 may include a different type of purification (e.g., desulfurization) material. For example, the sorbent bed units 82 may include different materials configured to purify a particular type of fuel. Accordingly, the use efficiency of the materials may be increased. While sorbent bed assembly 80 is shown to include three sorbent bed units 82, the assembly 80 may contain any suitable number of sorbent bed units 82, such as two, four, or more (e.g., five to ten).

A cover plate 87 is located over each of the sorbent bed units 82, and may connect the sorbent bed units 82 to one another. In some embodiments, the cover plate 87 may be formed by welding together the top plates 85 of each sorbent bed unit 82. The sorbent bed assembly 80 may further include a manifold 90 (see FIGS. 5A and 5B) to fluidly connect the sorbent bed units 82 in series. This may allow for a reduction in the number of connections needed to connect the sorbent bed assembly 80 to fuel inlet and outlet manifolds, as discussed below.

The sorbent bed assembly 80 may include a support pallet 92. The support pallet 92 facilitates the installation and removal of the sorbent bed assembly 80 with respect to the fuel processor 17. The support pallet 92 may include openings 94 configured to mate with a lifting device, such as a fork lift.

While the sorbent bed assembly 80 described above includes loose desulfurization material in a generally rigid sorbent bed units 82, in another exemplary embodiment, desulfurization material may be pre-loaded into gas permeable bags. Then, the packaging of the desulfurization material into the desulfurization sorbent bed units 82 is simplified via loading the bags into the sorbent bed structure (e.g., containers 81), thereby eliminating the need to pour material into place. This makes disassembly simpler, because the bags may be quickly removed. Handles, ropes, or other features might be attached to the bags to aid in removal of bags of spent material from the sorbent bed units 82. While the sorbent bed assembly 80 is described as being a desulfurization assembly, the sorbent bed assembly 80 may also remove other contaminants from a fuel, and/or perform other fuel processing operations.

Figure 4:
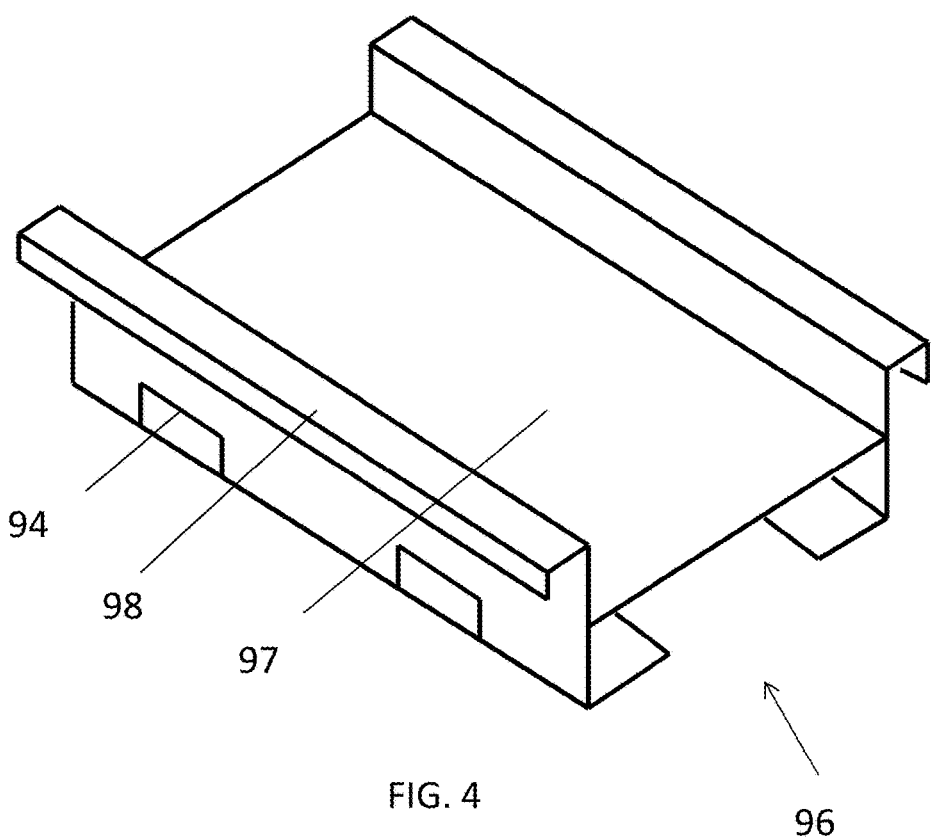
FIG. 4 illustrates a perspective view of a pallet of a sorbent bed assembly, according to various embodiments of the present disclosure.

FIG. 4 illustrates a support pallet 96 similar to the support pallet 92. Referring to FIG. 4, the support pallet 96 includes a main body 97 configured to receive the sorbent bed assembly 80. The support pallet 96 additionally includes side rails 98 that extend laterally from the main body 97. The side rails 98 are configured to allow the support pallet 96 to be addressed by a pallet jack or the like approaching from a short side of the support pallet 96. In other words, arms of a pallet jack may be disposed under the side rails 98, in order to lift the support pallet 96.

Figure 5A:
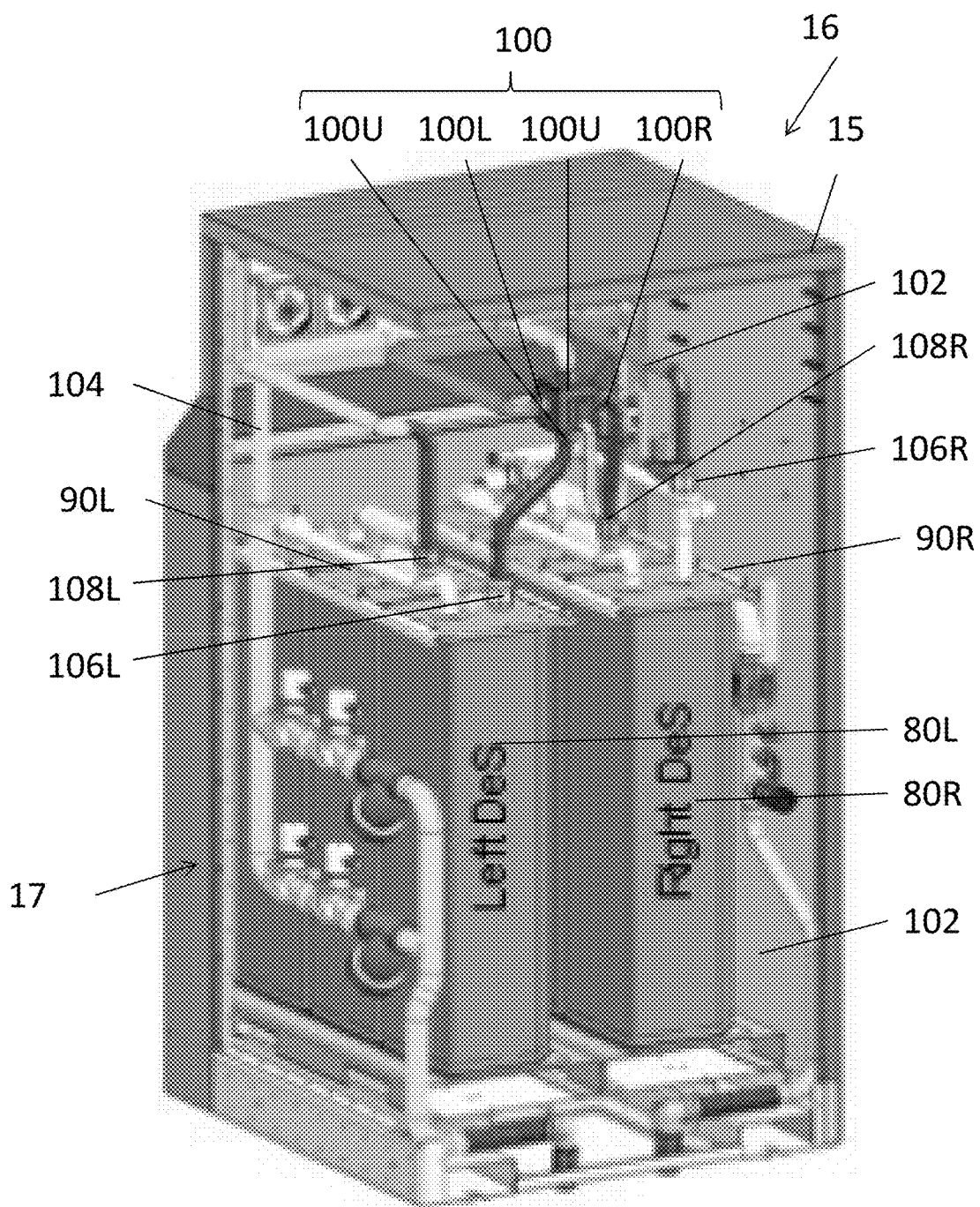
FIG. 5A illustrates a partial perspective view of a fuel processor included in the fuel cell system of FIG. 1, according to various embodiments of the present disclosure.
Figure 5B:
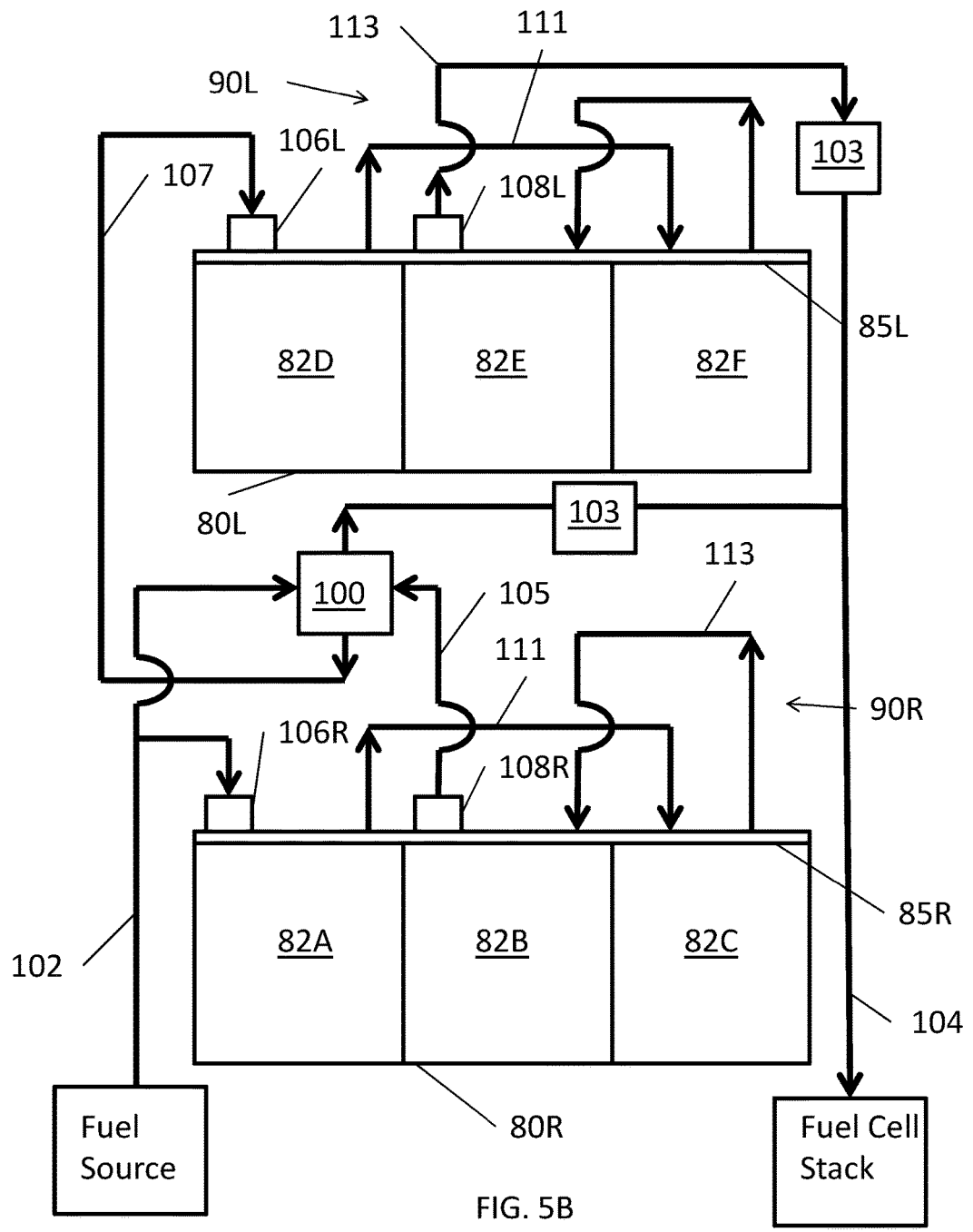
FIG. 5B schematically illustrates fuel flow through a fuel processor having a plurality of sorbent bed assemblies, according to an embodiment.

FIG. 5A illustrates a perspective view of a fuel processor 17 disposed in the fuel processing module 16, according to various embodiments of the present disclosure. FIG. 5B illustrates a schematic view of components of the fuel processor 17 according to one embodiment. Referring to FIGS. 5A and 5B, the fuel processor 17 includes a right sorbent bed assembly 80R (right assembly), a left sorbent bed assembly 80L (left assembly), a valve 100, a fuel inlet manifold 102 and a fuel outlet manifold 104. According to some embodiments, the fuel processor 17 may include detectors 103 configured to detect fuel contaminants, such as sulfur, present in fuel streams output from the right and left assemblies 80R, 80L. Although only two sorbent bed assemblies are shown in FIGS. 5A-5B, as discussed above a fuel processor 17 may include more than two sorbent bed assemblies. Each of the assemblies may be connected to a fuel inlet manifold 102 and a fuel outlet manifold 104, such as via one or more valves 100.

The right sorbent bed assembly 80R includes a cover plate 85R, an inlet connector 106R, an outlet connector 108R, sorbent beds 82A, 82B, 82C, and a right manifold 90R. In particular, the right manifold 90R connects the sorbent beds 82A, 82B, 82C, such that fuel output from bed 82A is provided to bed 82C, and fuel output from bed 82C is provided to bed 82B. The left sorbent bed assembly 80L includes a cover plate 85L an inlet connector 106L, an outlet connector 108L, sorbent beds 82D, 82E, 82F, and a left manifold 90L. In particular, the left manifold 90R connects the sorbent beds 82D, 82E, 82F, such that fuel output from bed 82D is provided to bed 82F, and fuel output from bed 82F is provided to bed 82E. These flow patterns are configured such that the inlet connectors 106R, 106L and the outlet connectors 108R, 108L are disposed adjacent to a door 30 of the fuel cell system 10 (see FIG. 1). As such, the inlet connectors 106R, 106L and the outlet connectors 108R, 108L may be easily accessed by a technician. The connectors 106R, 106L, 108R and 108L may be quick-connect type connectors.

In general, a sorbent bed assembly 80R, 80L according to various embodiments may include three or more sorbent beds, including a first sorbent bed (e.g., 82A or 82D), a second sorbent bed (e.g., 82B or 82E) and at least one third sorbent bed (e.g., 82C or 82F), where the second sorbent bed (82B or 82E) is located between the first sorbent bed (82A or 82D) and the at least one third sorbent bed (82C or 82F). The manifolds 90R, 90L may each include a first fluid conduit 111 configured to transport fuel between the first sorbent bed (82A or 82D) and the at least one third sorbent bed (82C or 82F), and a second fluid conduit 113 configured to transport fuel between the at least one third sorbent bed (82C or 82F) and the second sorbent bed (82B or 82E). In the embodiment shown in FIG. 5A, the fuel inlet connector (106R or 106L) provides fuel to the first sorbent bed (82A or 82C), the first fluid conduit 111 transports fuel output from the first sorbent bed (82A or 82C) to the third sorbent bed (82C or 82F), the second fluid conduit 113 transports fuel output from the third sorbent bed (82C or 82F) to the second sorbent bed (82B or 82D), and the fuel outlet connector (108R or 108L) outputs fuel from the second sorbent bed (82B or 82D). Alternatively, the flow path may be reversed such that the fuel is input to the sorbent bed assembly 80R, 80L at the second sorbent bed (82B or 82D) and output from the assembly 80R, 80L at the first sorbent bed (82A or 82C).

The fuel inlet manifold 102 may be configured to divide a fuel stream into a first fuel stream input to the right assembly 80R, and a second fuel stream input to the left assembly 80L. According to some embodiments, the fuel inlet manifold 102 may be referred to as a "fuel inlet conduit". The fuel outlet manifold 104 may be configured to receive the first and second fuel streams, after the streams have been purified by the right and left assemblies 80R, 80L. According to some embodiments, the fuel outlet manifold 104 may be referred to as a "fuel outlet conduit".

The valve 100 may be coupled to the fuel inlet manifold 102 and the fuel outlet manifold 104 and may be configured to provide a plurality of different flow states of fuel flow through the right and left assemblies 80R, 80L. For example, the valve 100 may be operable to provide a first flow state in which fuel from the inlet manifold 102 flows through the right assembly 80R and into the outlet manifold 104, but fuel does not flow through the left assembly 80L. The valve 100 may also be operable to provide a second flow state in which fuel from the inlet manifold 102 flows through the left assembly 80L and into the outlet manifold 104, but fuel does not flow through the right assembly 80R. The valve 100 may optionally also be operable to provide a third flow state in which fuel from the inlet manifold 102 flows through both the right and left assemblies 80R, 80L into the outlet manifold and/or a fourth flow state in which fuel from the inlet manifold 102 does not flow through either the right or left assemblies 80R, 80L into the outlet manifold 104.

In one embodiment, shown in FIGS. 5A and 5B, the valve 100 may be a four-way valve, such as a four-way ball valve. The valve 100 may be operated manually or automatically (e.g., in response to control signals from a system controller). The valve 100 may be selectively actuated to provide at least a first flow state in which fuel from the inlet manifold 102 flows through the right assembly 80R and into the outlet manifold 104, but fuel does not flow through the left assembly 80L, and a second flow state in which fuel from the inlet manifold 102 flows through the left assembly 80L and into the outlet manifold 104, but fuel does not flow through the right assembly 80R. In the first flow state, a first flow path (indicated by dotted line 115) through the valve 100 may be open while a second flow path (indicated by dotted line 117) is closed, and in the second flow state, the second flow path 117 may be open while the first flow path 115 is closed. In some embodiments, the valve 100 may also be selectively actuated to provide a third flow state in which both the first and second flow paths 115, 117 are open and/or a fourth flow state in which both the first and second flow paths 115, 117 are closed.

In the example shown in FIGS. 5A and 5B, the fuel inlet manifold 102 is connected to a first port 100L of the valve 100 and to the inlet connector 106R of the right assembly 80R. The fuel inlet manifold 102 may have a self-sealing valve where it connects with the inlet connector 106R such that fuel flow is automatically stopped when the fuel inlet manifold 102 is disconnected from connector 106R.

The fuel outlet manifold 104 is connected to a second port 100U of the valve 100 and to the outlet connector 108L of the left assembly 80L. The fuel outlet manifold 104 may have a self-sealing valve where it connects with the outlet connector 108L of the left assembly 80L. The outlet connector 108R of the right assembly 80R is connected to a third port 100R of the valve 100 by a first connection conduit 105. The inlet connector 106L of the left assembly 80L is connected to a fourth port 100B of the valve 100 by a second connection conduit 107.

The valve 100 is configured to control the flow of the first and second fuel streams through the left and right assemblies 80L, 80R. In particular, the valve 100 may control the flow of fuel into and/or out of the right and left manifolds 90R, 90L. For example, if the valve 100 is configured such that both paths 115 and 117 through the valve 100 are open, a first fuel stream flows from the fuel inlet manifold 102 into the inlet connector 106R, through the right assembly 80R, the outlet connector 108R, the first connection conduit 105 and into the fuel outlet manifold 104 via path 115 through the valve 100. A second fuel stream flows from the fuel inlet manifold 102 through path 117 of the valve 100 to the second connection conduit 107, the inlet connector 106L, through the left assembly 80L and from the outlet connector 108L into the fuel outlet manifold 104. If the valve 100 is configured such that path 115 is open but path 117 is closed, then fuel continues to flow through the right assembly 80R, but fuel is stopped from flowing through path 117 into the second connection conduit 107 and the inlet connector 106L of the left assembly 80L. Thus, fuel is prevented from flowing through the left assembly 80L to the outlet manifold 104. Conversely, if path 117 is open but path 115 is closed, then fuel flows through path 117 to the left assembly 80L, but fuel is stopped from flowing from the outlet connector 108R of the right assembly 80R to the fuel outlet manifold 104. Thus, fuel is prevented from flowing through the right assembly 80R to the outlet manifold 104.

If one of the right and left assemblies 80R, 80L requires replacement, the valve 100 can be adjusted, such that the fuel flows only through the other assembly. For example, if the right assembly 80R requires replacement, the path 115 through the valve 100 may be closed while path 117 remains open. Thus, the right assembly 80R may be removed and replaced, while fuel continues to flow through the left assembly 80L.

If the left assembly 80L requires replacement, the path 117 through valve 100 may be closed while path 117 remains open. Thus, the left assembly 80L may be removed and replaced, while fuel continues to flow through the right assembly 80R.

It will be understood that various other flow path and valve configurations may be utilized for a fuel processor 17 having a plurality of modular sorbent bed assemblies. For example, a plurality of modular sorbent bed assemblies such as described above may be disposed in a serial flow arrangement, such that the output of a first assembly is provided as an input to a second assembly. One or more valves may be configured to provide a by-pass arrangement in which each assembly may be selectively disconnected from the fuel flow for removal while fuel may continue to flow through at least one other assembly of the fuel processor 17.

In further embodiments, the fuel processor 17 may include an alarm system that ensures that one or more valves, such as valve 100 described above, are in an appropriate configuration for removal of an sorbent bed assembly. The alarm system may provide a perceptible indication (e.g., a visual or audio signal) that indicates whether or not a particular sorbent bed assembly may be removed from the fuel processor 17.

Figure 6A:
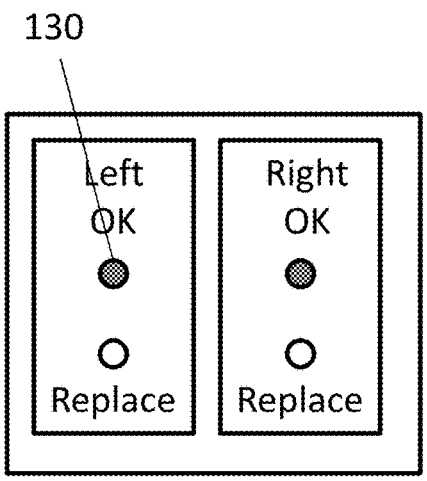
FIGS. 6A-6C illustrate display panels indicating the status of sorbent bed assemblies, according to various embodiments of the present disclosure.
Figure 6B:
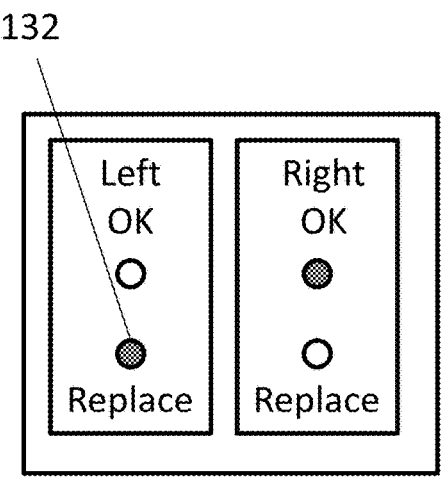

FIGS. 6A-6B illustrate an example of an alarm system that includes a display panel 600 configured to provide a visual indication of whether an sorbent bed assembly may be removed from the fuel processor 17, such as for servicing or replacement. The display panel 600 in this embodiment is for a fuel processor 17 having two sorbent bed assemblies (e.g., right and left assemblies 80R, 80L as shown above in FIGS. 5A-5B), although it will be understood that a display panel may provide similar indications for a fuel processor having more than two sorbent bed assemblies. A display panel 600 may be provided in any suitable location, such as on a housing of the fuel processor 17 or on the sorbent bed assemblies themselves. With regard to FIGS. 6A and 6B, a two indicator display panel 600 configuration is shown. In particular, as shown in FIG. 6A, when upper indicators 130 are lit, an operator is informed that fuel is flowing through both the right and left assemblies 80R, 80L, and thus neither assembly 80R, 80L is ready to be removed. As shown in FIG. 6B, when a lower indicator 132 is lit, an operator is informed that fuel is not flowing through the specified assembly (i.e., the left assembly in FIG. 6B), thereby indicating that the assembly is OK to be removed.

Figure 6C:
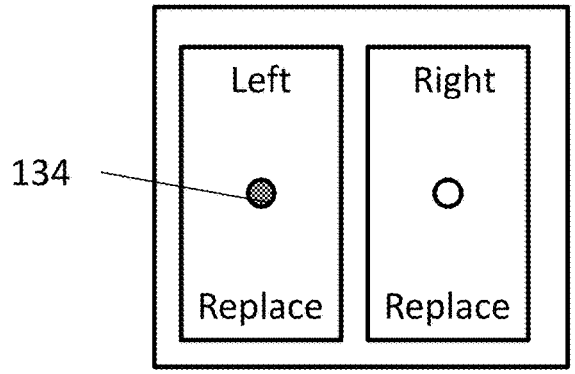

The visual indications provided by the display panel 600, 601 may be based on sensor data received from the fuel processor 17. For example, one or more flow sensors may be located in the fuel processor 17 to indicate whether fuel is flowing through a particular sorbent bed assembly. Alternately or in addition, a sensor may detect the position of a valve, such as valve 100 described above, to indicate the fuel flow state of the fuel processor 17. A suitable valve position sensor may be a limit switch or proximity switch, for example. Referring to FIG. 6C, a single indicator display panel 601 is shown. In particular, when an indicator 134 is lit, an operator is informed that a corresponding assembly is OK to be removed.

Figures 7A, 7B, 7C:
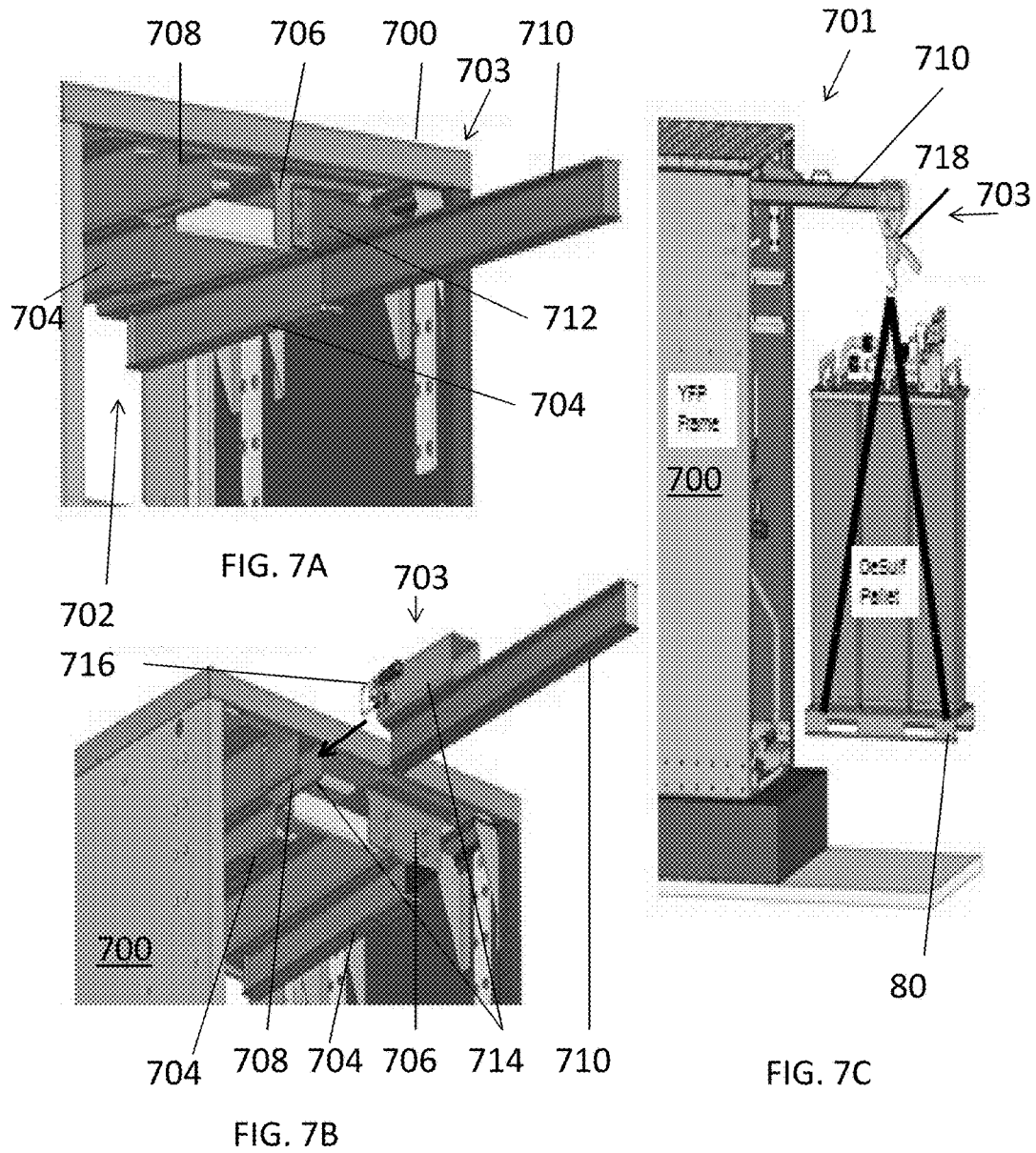
FIGS. 7A-7C illustrate a loading system for loading a fuel processing assembly into a fuel processor cabinet, according to various embodiments of the present disclosure.

As discussed above and illustrated in FIG. 5B, one or more detectors 130 may be provided in the fuel flow path of the fuel processor 17 downstream of the sorbent bed assemblies. The one or more detectors 130 may detect for the presence of unwanted contaminants in the fuel stream. In some embodiments, the detector(s) 130 may be configured to detect a "breakthrough event" (i.e., bed exhaustion) in one of the sorbent bed assemblies, such as described in commonly-owned U.S. application Ser. No. 14/589,403, which is incorporated by reference herein in its entirety. The detection of unwanted contaminants in the fuel stream by a detector 130 may trigger an alarm system provide an indication to an operator that a particular sorbent bed assembly should be removed for servicing or replacement. The alarm system may be a display panel that provides a visual indicator, such as described above with reference to FIGS. 6A-6C. Alternately or in addition, the alarm system may provide an audible alarm. In some embodiments, the triggering of the alarm system may cause one or more valves, such as valve 100 described above, to automatically adjust its position to stop fuel flow through particular sorbent bed assembly and/or transition flow to one or more additional assemblies A modular sorbent bed assembly 80 such as described above may be relatively heavy (e.g., ~800 lbs.) and difficult to move, particularly for a single individual. Various embodiments include methods and systems for loading and/or removing a sorbent bed assembly 80 to or from a fuel processor 17. FIGS. 7A-7C illustrate a system 703 for loading/unloading an sorbent bed assembly 80 into or from a cabinet 700 of a fuel processing module 701, according to various embodiments of the present disclosure. According to some embodiments, the fuel processing module 701 may be part of a modular fuel cell system similar to the system show in FIG. 1.

Referring to FIGS. 7A and 7B, the system 703 includes a beam assembly 702 disposed inside of the fuel processor cabinet 700, so as not to increase the size (e.g., "footprint") of the fuel processor cabinet 700. For example, the beam assembly 702 may be attached to the top of the fuel processor cabinet 700. The beam assembly 702 includes at least one beam portion 704, and at least one mounting portion 706, 708 attached to the at least one beam portion 704. The beam assembly 702 may be located in the interior of the cabinet 700, and may be mounted to the top interior surface of the cabinet 700, as shown in FIGS. 7A-7B. The mounting portion 706, 708 may face out towards a side of the cabinet 700 (e.g., towards a door of the cabinet 700) and the beam portion 104 may extend within the cabinet 700 below the mounting portion 706, 708. The beam assembly 702 may be substantially permanently mounted to the cabinet 700, meaning that the beam assembly 702 may remain mounted to the interior of the cabinet 700 during normal operation of the fuel processing module 701. In FIGS. 7A and 7B, the beam assembly 702 includes two mounting portions (i.e., first mounting portion 706 and second mounting portion 708) attached to the cabinet 700 with beam portions 104 located beneath each of the mounting portions 706, 708. It will be understood that beam assembly 702 may include more than two mounting portions and beam portions or may include a single mounting portion and beam portion. The beam assembly 702 may formed as a single integral unit, or may be comprised of separate components mounted to the cabinet 700.

The loading/unloading system 703 may also include a beam extension 710 that may be configured to be removably attached to a mounting portion 706, 708 of the beam assembly 702. The beam extension 710 may have a similar shape (e.g., I-beam shape) as the beam portion(s) 704 of the beam assembly 702 and may be positioned adjacent to a beam portion 704 when the beam extension 710 is attached to a mounting portion 706, 708. The beam extension 710 may thus effectively extend the length of the beam portion 704 of the beam assembly 702 outside of the cabinet 700, as shown in FIG. 7C. The beam extension 710 may be attached to a mounting portion 706, 708 using a variety of attachment mechanisms. The embodiment of FIGS. 7A-7B illustrates two possible attachment mechanisms. In a first example, shown in FIG. 7A, the beam extension 710 is attached to the first mounting portion 706 using bolts or similar fasteners. As shown in FIG. 7A, the beam extension 710 in this embodiment includes a bracket portion 712 having a substantially flat surface that engages with and is bolted to a mating surface of the first mounting portion 706.

In a second example shown in FIG. 7B, the beam extension 710 is attached to the second mounting portion 708 using one or more clamps 716 (e.g., a quick-release clamp, such as a toggle clamp). In this embodiment, the beam extension 710 and the second mounting portion 708 include mating tube portions 714 and the clamp(s) 716 may be engaged to secure the beam extension 710 to the beam assembly 702.

Although FIGS. 7A and 7B illustrate a beam assembly 702 which utilizes different attachment mechanisms for attaching a beam extension 710 to first and second mounting portions 706, 708, it will be understood that a beam assembly 702 may use a single type of attachment for each of the mounting portions.

The loading/unloading system 703 also includes a trolley hoist 718, as shown in FIG. 7C. The trolley hoist 718 is configured to hoist a sorbent bed assembly 80 either from the floor of the cabinet (for removal of the assembly 80) or from a replacement position outside of the cabinet 700 (for installation of an assembly 80) to a raised position slightly above the floor of the cabinet 700. The sorbent bed assembly 80 may include a pallet supporting the assembly 80, and the trolley hoist 718 may be secured to the pallet (e.g., via one or more high-strength cables, chains or straps) to raise and lower the pallet and sorbent bed assembly 80. The trolley hoist 718 may also be configured to slide along the beam extensions 710 and/or the beam portion 704, such that the sorbent bed assembly 80 can be moved out of or into position inside of the cabinet 700. In embodiments, the trolley hoist 718 may include wheels that roll along the beam extension 710 and/or the loading beam 704. Once in position, the sorbent bed assembly 80 may be lowered by the trolley hoist 718 onto the floor of the cabinet 700 (i.e., an operating position). Accordingly, the sorbent bed assembly 80 may be installed into the cabinet 700. In order to remove the sorbent bed assembly 80, the above process can be reversed.

Figure 8:
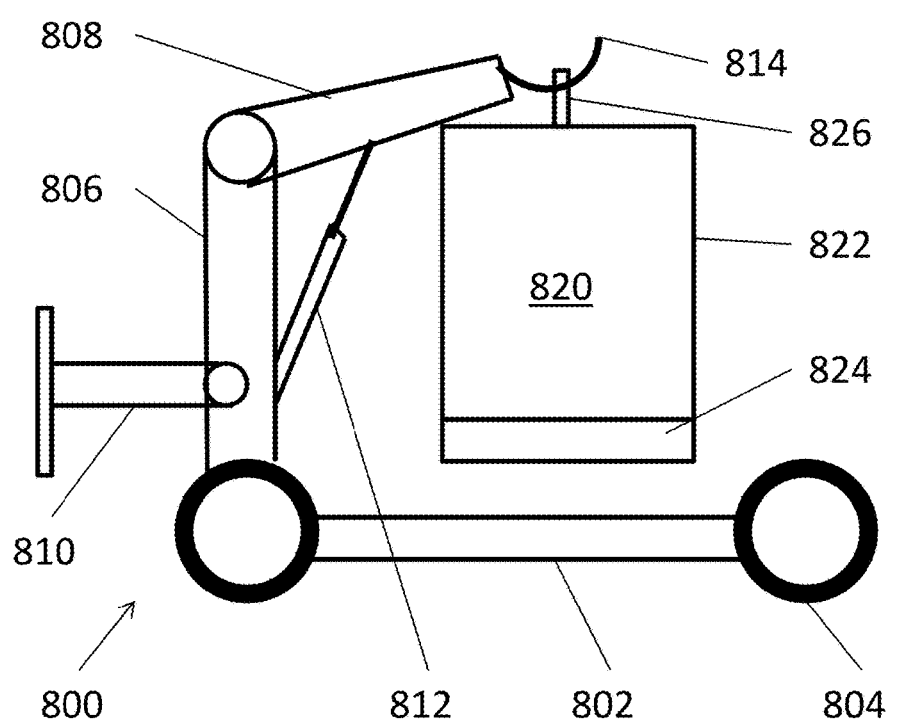
FIG. 8 illustrates a side view of a cart for manipulating an absorption bed assembly, according to various embodiments of the present disclosure.

FIG. 8 illustrates a cart 800 for transporting an sorbent bed assembly 820, according to various embodiments of the present disclosure. Referring to FIG. 8, the cart 800 includes a body 802, wheels 804, a mast 806, an arm 808, a handle 810, an arm support 812, and a hook 814. The body 802 is configured to receive the sorbent bed assembly 820. The sorbent bed assembly 820 may include a pallet 824 supporting the sorbent bed containers 822. The sorbent bed assembly 820 may include an attachment point 826 configured to receive the hook 814.

The mast 806 may include a first end attached to the arm 808 and an opposing second end that is hinged to the body 802. In particular, the mast 806 may be configured to be moved (rotated) between an operating position, where the mast 806 is substantially perpendicular to the body 802, as shown in FIG. 8, and a storage position, where the mast 806 is substantially parallel with the body 802. The handle 810 may include a first end that is hinged to the first end of the mast 806, and an opposing second end. The handle may be used to manipulate the cart 800. The handle 810 may be configured to move between an operating position, where the handle 810 substantially perpendicular to the mast 806, and a storage position, where the handle 810 is substantially parallel to the mast 806 (i.e., rests against the mast 806). Alternately, the handle 810 may be removable from the cart 800.

The arm 808 includes a first end that is hinged to the first end of the mast 806 and an opposing second end. The arm 808 may be configured to move (rotate) between an operating position as shown in FIG. 8, where the arm 808 forms a right or obtuse angle with respect to the mast 806, and a storage position, where the arm 808 is folded against the mast 806 (i.e., is substantially parallel to the mast 806).

The arm support 812 extends between the mast 806 and the arm 808 and is configured to support the arm 808, such as when the arm 808 is in the operating position. The arm support 812 may actively or passively support the arm 808. For example, the arm support 812 may operate as an actuator to rotate the arm 808 respect to the mast 806. In particular, the arm support 812 may operate to rotate the arm 808, such that the arm may lift the sorbent bed assembly 820. Once the arm 808 is in a desired position, the arm support 812 may be locked in position. When locked, the arm support 812 may prevent further rotation of the arm 808. The arm support 812 may be a hydraulic jack, which may be operated using the handle 810.

The wheels 804 may be configured to fold 90 degrees, such that the wheels 804 and the body 802 are in the same plane. As such, the wheels 804 may be folded for reducing space needed to store the cart 800.

FIGS. 9A-9D illustrate further embodiment systems 903 for loading/unloading an sorbent bed assembly 80 into or from a fuel processor cabinet 900 of a fuel cell system, according to various embodiments of the present disclosure.

Figure 9A:
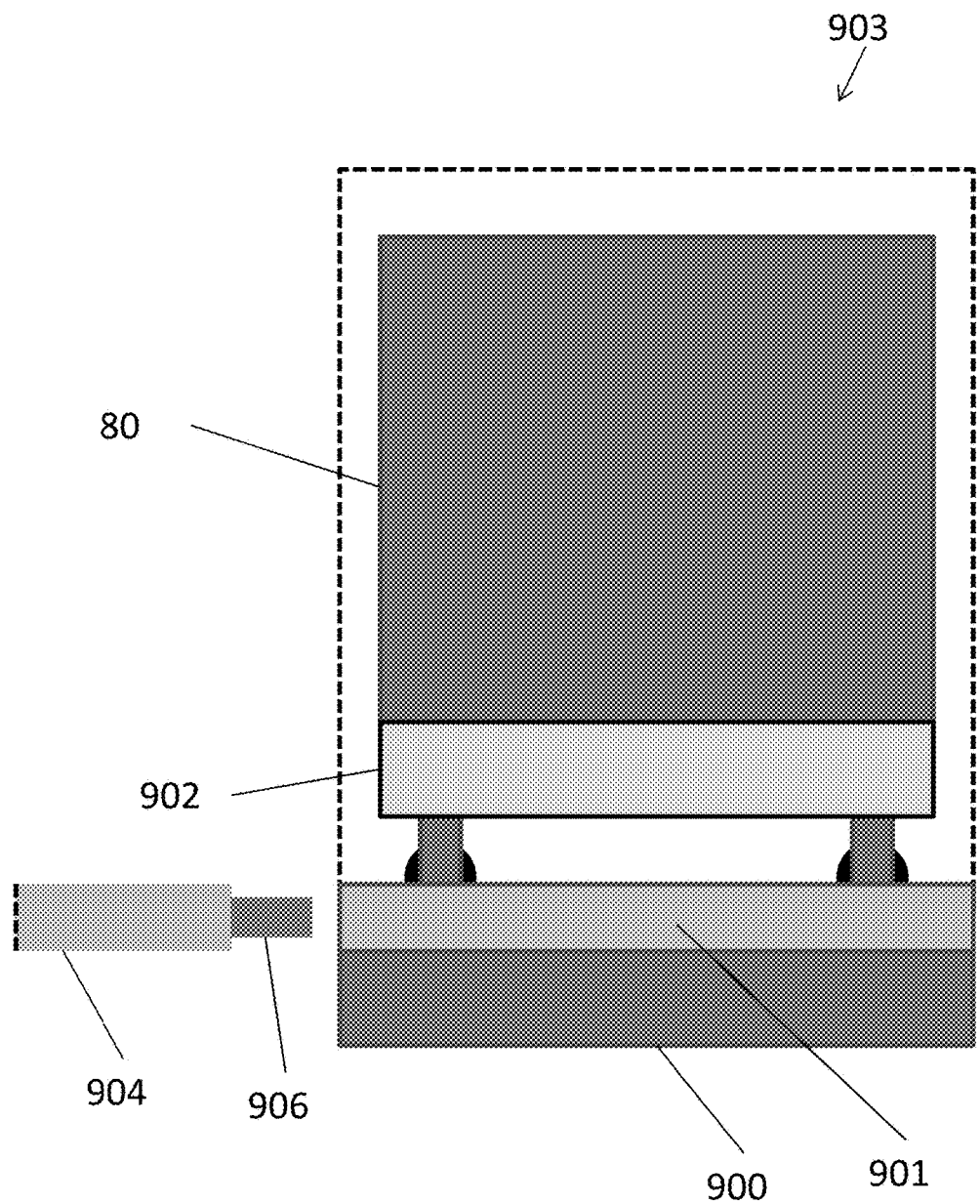
FIGS. 9A-9C illustrate a loading system for loading a fuel processing assembly into a fuel processor cabinet, according to various embodiments of the present disclosure.
Figure 9B:
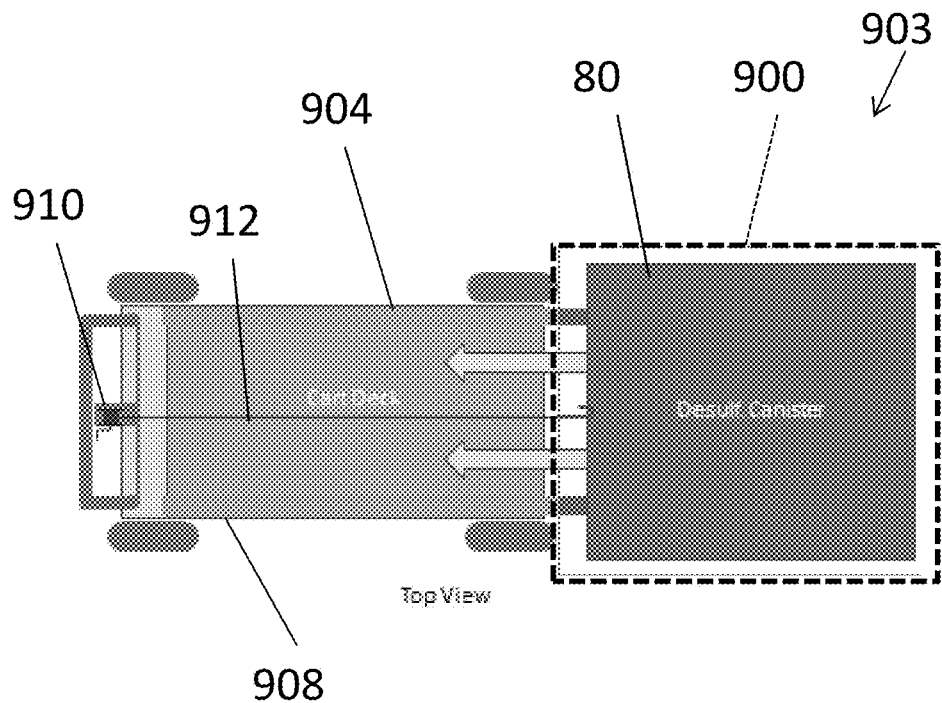
Figure 9C:
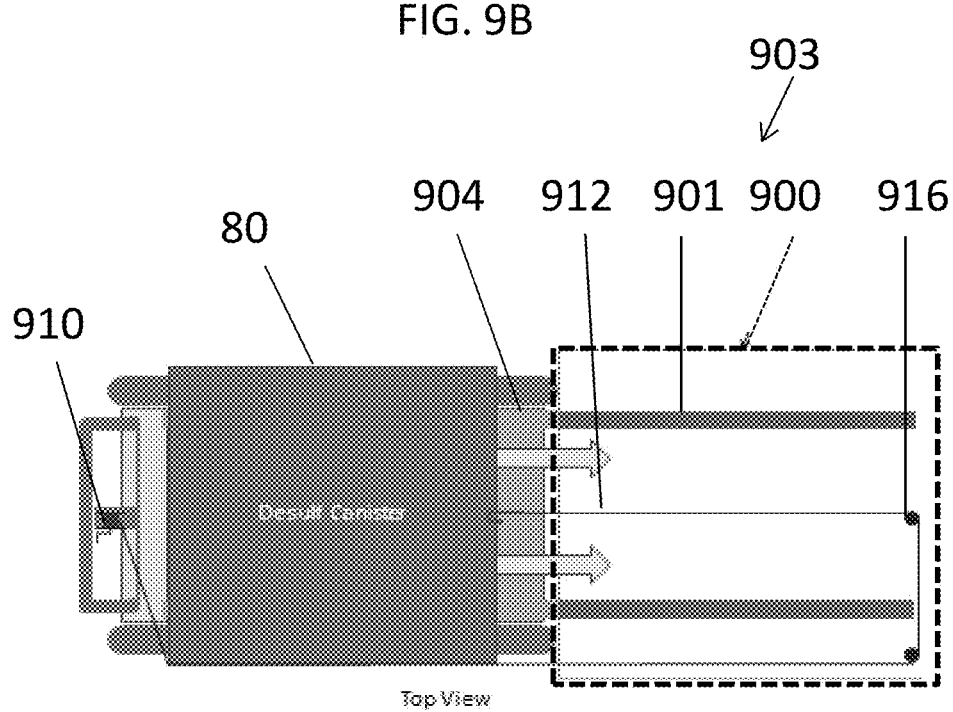
Figure 9D:
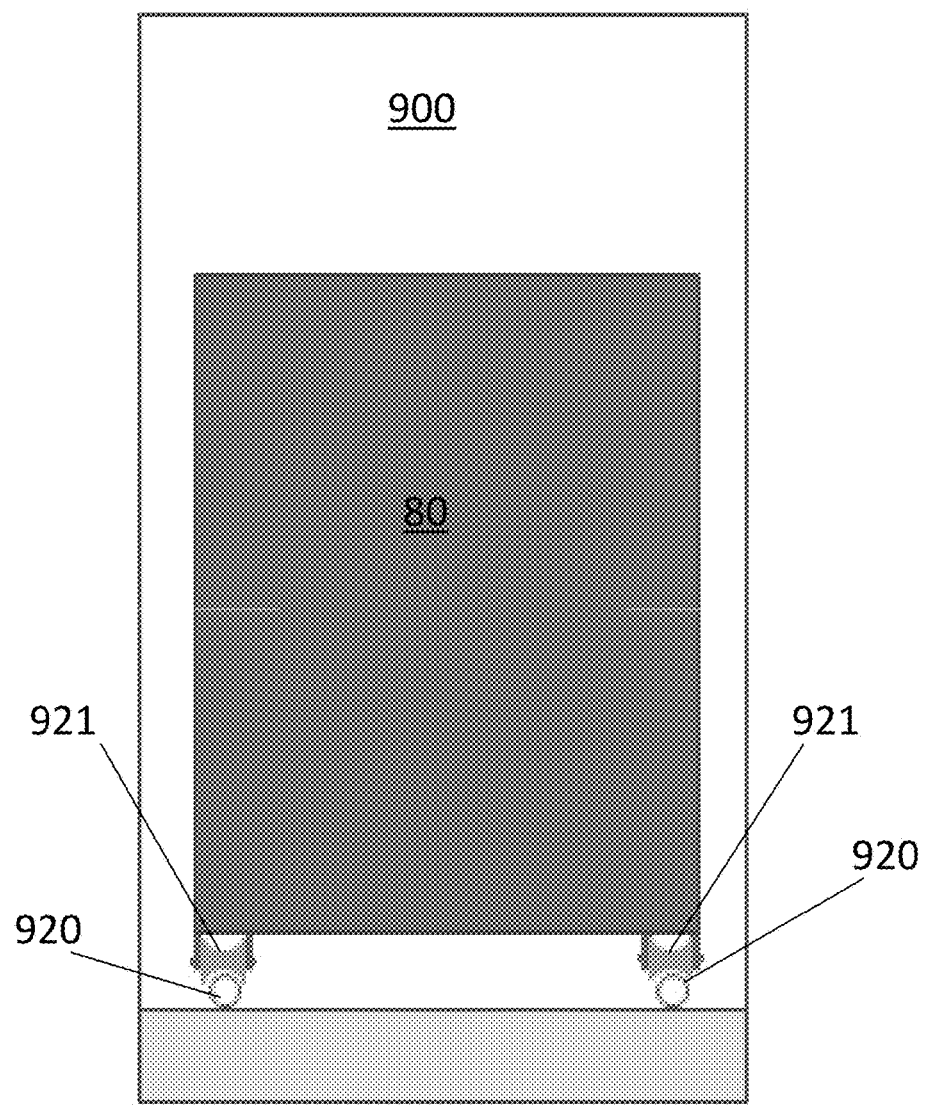
FIG. 9D illustrates an alternative system for loading and unloading of a fuel processing assembly.

Referring to FIGS. 9A-9C, the system 903 includes a wheeled pallet 902 upon which the sorbent bed assembly 80 is disposed, and a wheeled cart 908. A cabinet 900 of a fuel processor includes first guide elements 901 configured to guide the pallet 902 when the pallet 902 is moved into and out of the cabinet 900. The first guide elements 901 may be, for example, a pair of tubular rails 920 that are designed to mate with wheels 921, which may be U-groove casters. This is illustrated in FIG. 9D, which is rotated 90° degrees relative to FIG. 9A to show the cross section shape of rails 920 and wheels 921. FIG. 9D also illustrates an alternative configuration in which the wheels 921 are directly attached to the housing of the sorbent bed assembly 80, and a separate pallet is not present.

The cart 908 includes second guide elements 904 (e.g., tubular rails as shown in FIG. 9D), which may be substantially identical to the first guide elements 901 in the cabinet 900, and are configured to guide the loading and unloading of the pallet 902 with respect to the cart 908. Ends 906 of the second guide elements 904 are configured to mate with the first guide elements 901, such that the first and second guide elements 901, 904 are aligned with one another. For example, the ends 906 of the second guide elements 904 may be configured to be inserted into the first guide elements 901. Alternately, the first guide elements 901 may be configured to be inserted into the ends 906 of the second guide elements 904. The cart 908 may also include a winch 910 and a wire 912 spooled on the winch 910.

In order to unload the sorbent bed assembly 80 from the cabinet 900, the cart 908 may disposed adjacent to the cabinet, such that the first and second guide elements 901, 904 are aligned with one another (i.e., the ends 906 of the second guide elements 904 are inserted into the first guide elements 901). The wire 912 may be attached to a first side of the pallet 902, and the winch 912 may be used to pull the pallet 902/sorbent bed assembly 80 onto the cart 908, using the wire 912. Alternately, the wire 912 may be attached to a first side of the sorbent bed assembly 80.

In order to load the sorbent bed assembly 80 into the cabinet 900, the cart 908 may be disposed adjacent to the cabinet. The wire 912 may be fed around one or more pulleys 916 disposed in the cabinet 900 and attached to a second side of the pallet 902 or to the sorbent bed assembly 80. The pulleys 916 may be configured to redirect the wire 912 to the second side of the pallet 902. The winch may be used to pull the pallet 902/sorbent bed assembly 80 onto the cabinet 900.

Figure 10A:
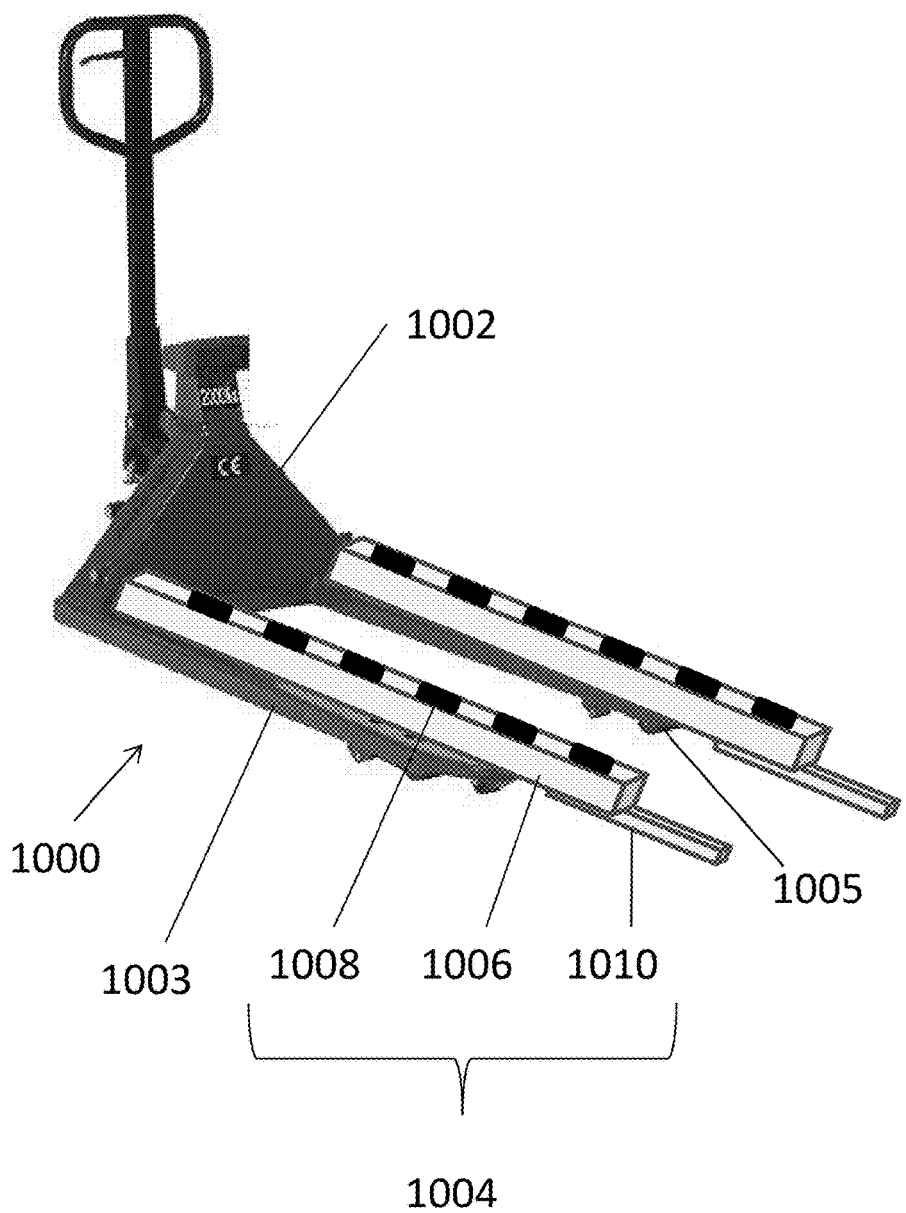
FIG. 10A illustrates a pallet jack for loading, unloading and transporting a sorbent bed assembly, according to an embodiment.
Figure 10B:
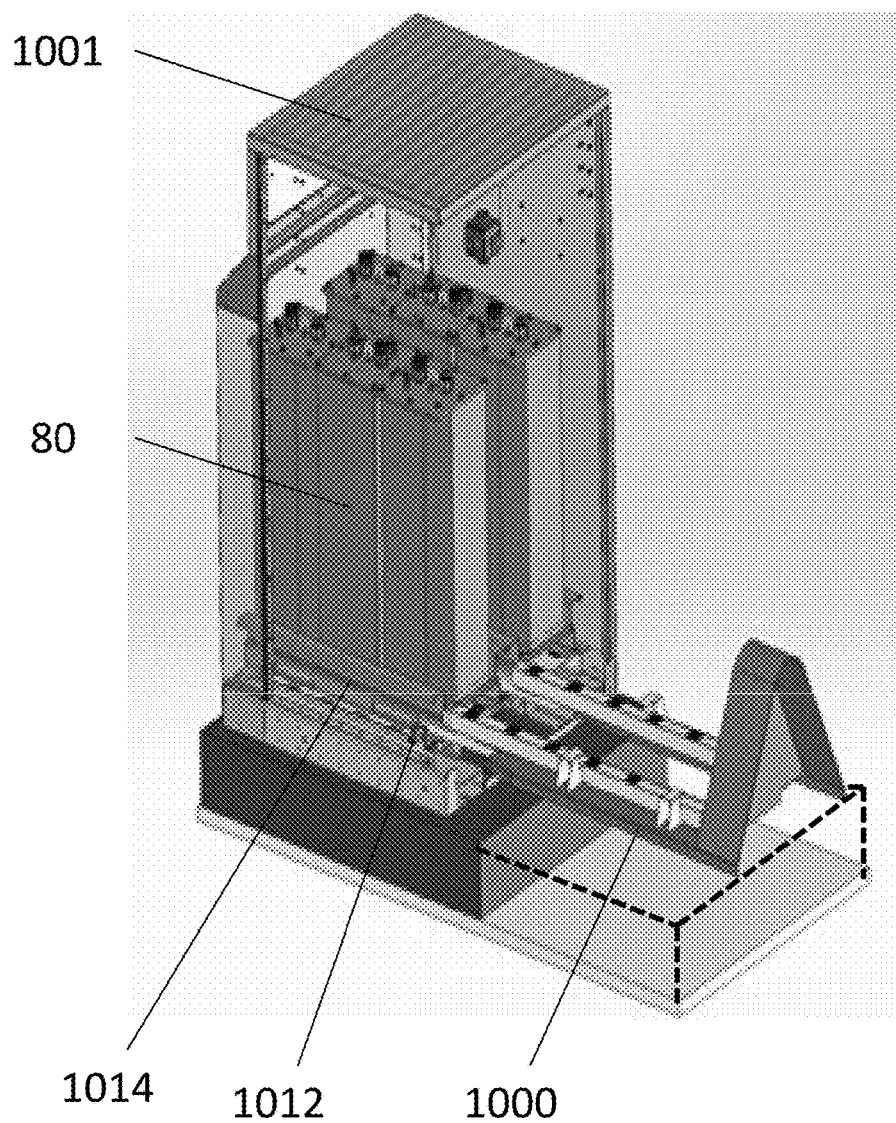
FIGS. 10B and 10C illustrate a pallet jack engaging a cabinet of a fuel processor for loading and/or unloading of a sorbent bed assembly.

FIG. 10A illustrates a pallet jack 1000 that may be used for loading or unloading of a sorbent bed assembly, according to various embodiments of the present disclosure. FIG. 10B illustrates the pallet jack 1000 interfacing with a cabinet 1001 of a fuel processing module, and FIG. 10C is an enlarged view of a portion of FIG. 10B.

Referring to FIG. 10A, the pallet jack 1000 includes a lifting portion 1002, which may be similar to a conventional mechanical or hydraulic jack. A pair of arms 1003 extend from the lifting portion 1002 upon which roller assemblies 1004 are mounted. Each roller assembly 1004 includes a body 1006 in which rollers 1008 are mounted. Each roller assembly 1004 also includes an extension rail 1010 located beneath the body 1006 and extending out further than the body 1006, as shown in FIG. 4.

Figure 10C:
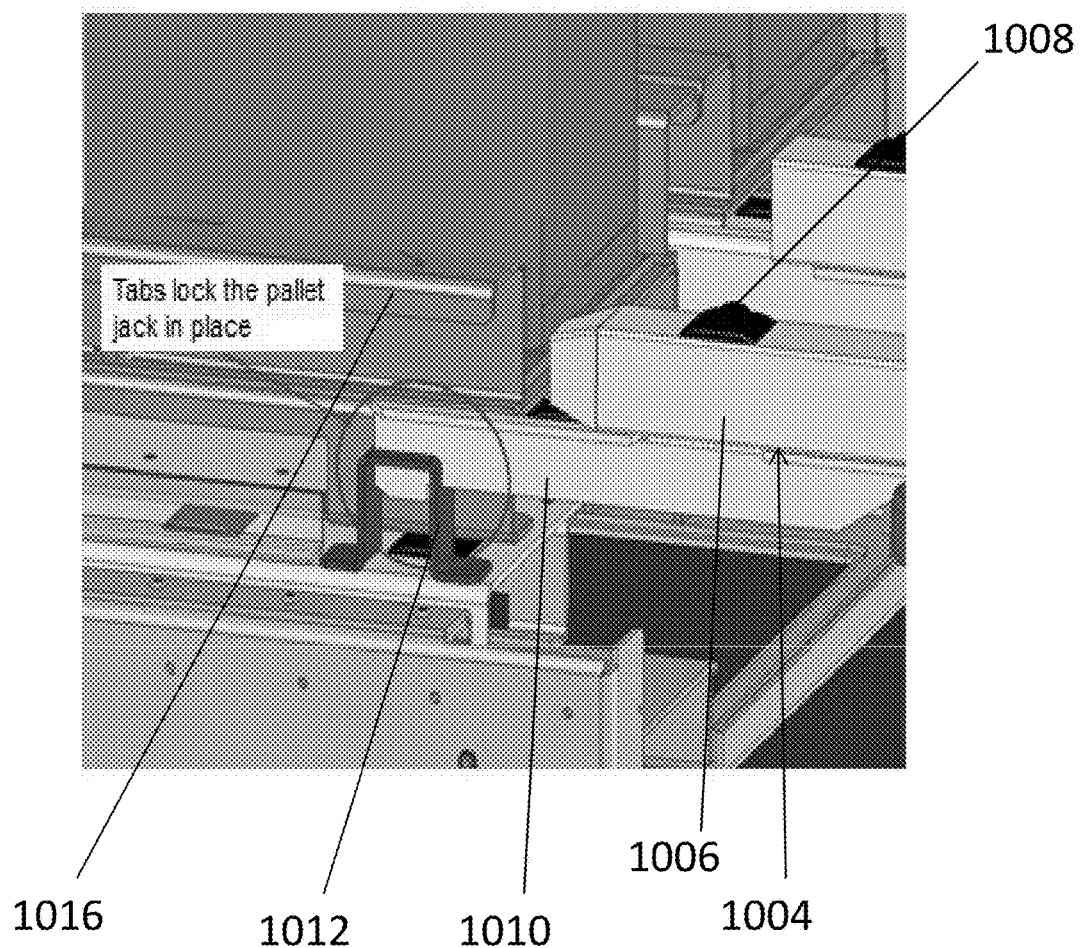

Referring to FIGS. 10B and 10C, the pallet jack 1000 may be inserted into a pallet 1014 supporting sorbent bed assembly 80. In particular, the body 1006 of the roller assembly 1004 may be inserted beneath side rails of a pallet, such as side rails 98 of the pallet 96 shown in FIG. 4. The lifting portion 1002 may raise or lower the pallet and sorbent bed assembly on the body 1006 of the roller assembly. The pallet jack 1000 may include wheels 1005 on the underside of the pallet jack 100 to enable transport of the pallet/sorbent bed assembly.

For loading or unloading of a sorbent bed assembly to or from a fuel processor, the pallet jack 1000 may be moved adjacent to a cabinet 1001 of the fuel processor, as shown in FIGS. 10B-10C. The extension rails 1010 may be inserted into alignment openings in the cabinet 1001. For example, as shown in FIGS. 10B-10C, the cabinet 1001 may include alignment brackets 1012 that ensure proper positioning of the roller assembly 1004 with respect to the cabinet 1001. The brackets 1012 may optionally lock the extension rails 1010 in place once they are in the proper position. Once the extension rails 1010 are properly positioned, the pallet 1014 may be rolled onto or off of the body 1006 of the roller assembly 1004 using the rollers 1008.

Figure 11A:
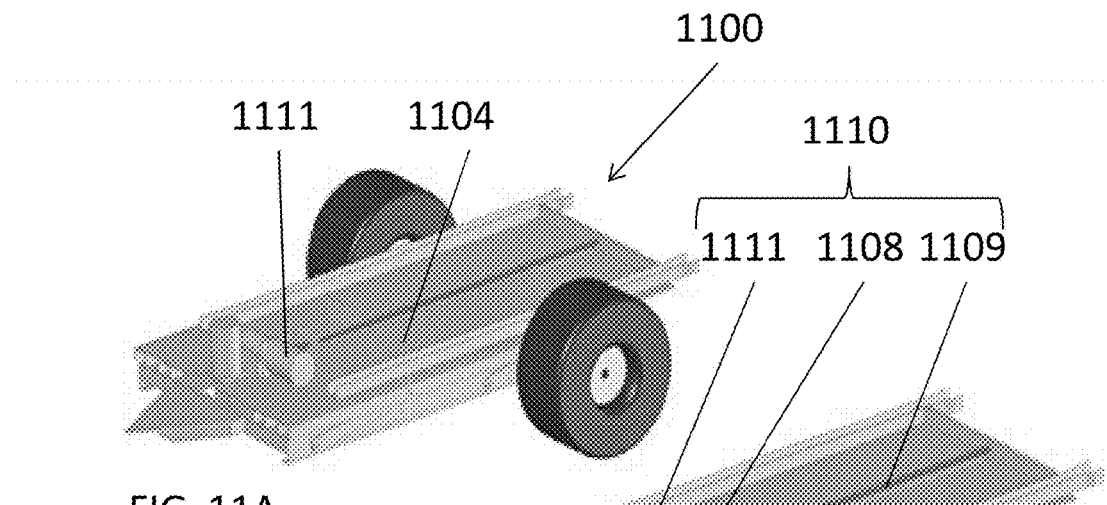
FIGS. 11A and 11B illustrate perspective views of a cart used for loading or unloading of a sorbent bed assembly in a lowered and a raised configuration, respectively.
Figure 11B:
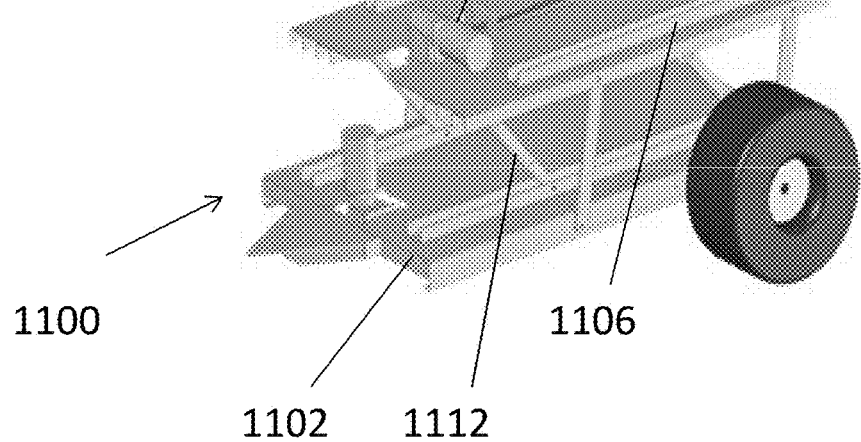
Figure 11C:
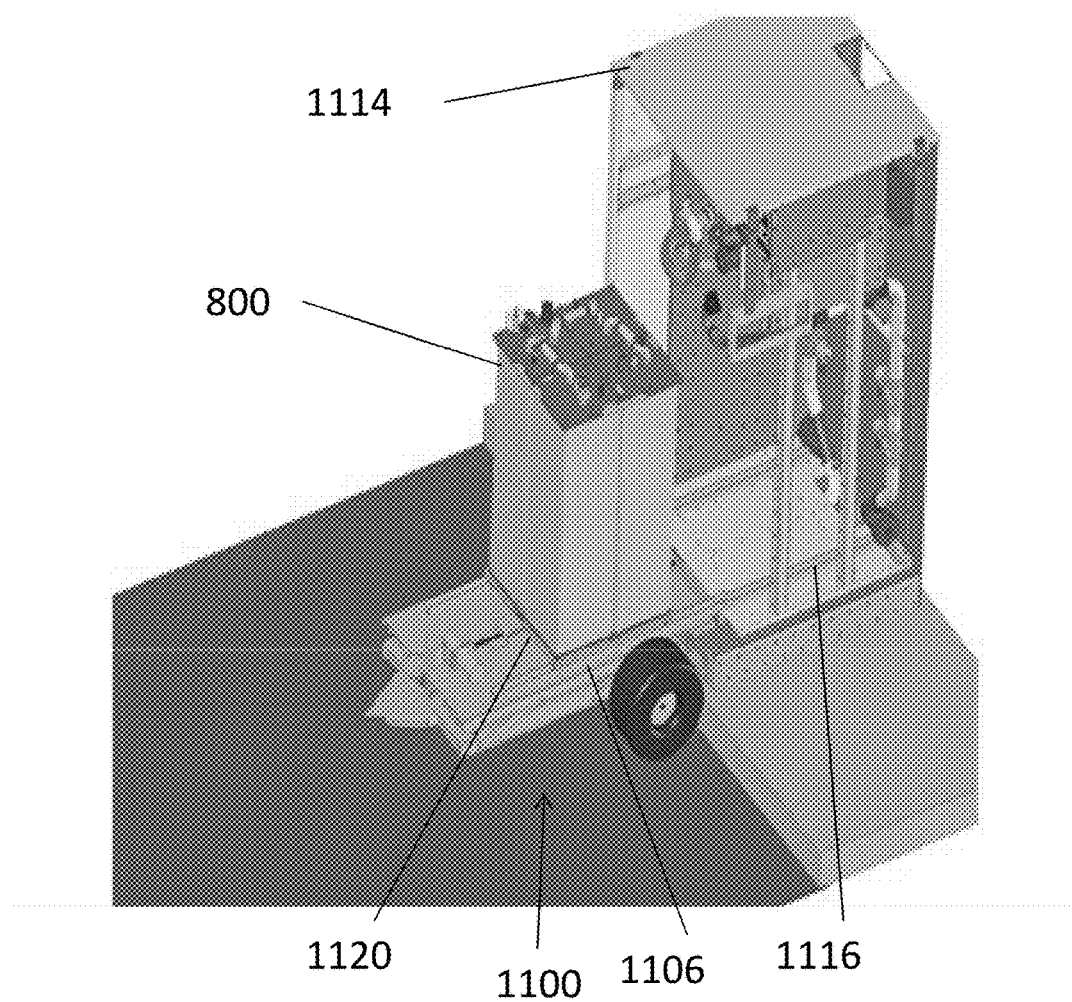
FIG. 11C illustrates a perspective view of the cart when mated with a cabinet of a fuel processor, according to various embodiments of the present disclosure.

FIGS. 11A and 11B illustrate perspective views of a cart 1100 that may be used for loading or unloading of a sorbent bed assembly, according to various embodiments of the present disclosure. FIG. 11A illustrates the cart 1100 in a lowered position and FIG. 11B illustrates the cart 1100 in a raised configuration. FIG. 11C illustrates a perspective view of the cart 1100 when mated with a cabinet 1114 of a fuel processor, according to various embodiments of the present disclosure.

Referring to FIGS. 11A-11C, the cart 1100 includes a wheeled frame 1102 and a stage 1104 disposed above the frame 1102. Guides 1106 and a translation mechanism 1110 are disposed on the stage 1104. The guides 1106 are configured to guide the movement of a sorbent bed assembly 800 across the stage 1104. For example, the sorbent bed assembly 800 may be supported on a wheeled pallet 1120 and the guides 1106 may comprise grooves within which the wheels ride as the pallet 1120 moves across the stage 1104. Alternately, the guides 1106 may comprise tubular rails and the wheels may include U-shaped grooves which made with the rails, such as described above with reference to FIG. 9D. The translation mechanism 1110 is configured to translate the sorbent bed assembly 800 and pallet 1120 across the stage 1104. The pallet 1120 may be a separate component from the sorbent bed assembly 800 which it supports, or may be formed integrally with the sorbent bed assembly 800 (e.g., may comprise a wheeled bottom portion of the sorbent bed assembly 800 housing).

The pallet mover 1110 may include a connector 1108 that may be attached to the pallet 1120 or to the sorbent bed assembly 800. An actuator 1110 may be mechanically coupled to the connector by a coupling mechanism 1109, such as a lead screw or cable/pulley system, for driving the movement of the pallet 1120. The actuator 1110 may be, for example, a manually or electrically powered winch or an electric motor.

The cart 1100 may include a lift 1112 configured to move the stage 1104 between a lowered position where the stage 1104 is disposed on the frame 1102, and a raised position where the stage 1104 is spaced apart from the frame 1102. For example, the lift 1112 may be a scissor lift. As such, the cart 1100 may be configured to deliver the sorbent bed assembly 800 to fuel processing cabinets 1114 of different heights. The cart 1100 may be moved with a powered tug or may be moved manually.

As shown in FIG. 11C, the guides 1106 may be configured to mate with corresponding guides 1116 in the cabinet 1114. As such, the sorbent bed assembly 800 may be inserted into, or removed from the cabinet 1114 by sliding along the guides 1106, 1116.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A sorbent bed assembly of a fuel cell system, the sorbent bed assembly comprising:
    a cabinet having a door;
    a plurality of sorbent beds configured to purify a fuel, the plurality of sorbent beds comprising a linear arrangement of a first sorbent bed, a second sorbent bed, and at least one third sorbent bed located in the cabinet, wherein the second sorbent bed is disposed between the first sorbent bed and the at least one third sorbent bed, and wherein the first and the second sorbent beds are located closer to the door than the at least one third sorbent bed;
    a cover plate disposed on the plurality of sorbent beds and configured to connect the sorbent beds to one another;
    a fuel inlet connector disposed on the cover plate over the first sorbent bed and configured to provide fuel to the first sorbent bed;
    a manifold comprising:
        a first fluid conduit configured to transport fuel from the first sorbent bed to the at least one third sorbent bed; and
        a second fluid conduit configured to transport fuel from the at least one third sorbent bed to the second sorbent bed; and
    a fuel outlet connector disposed on the cover plate over the second sorbent bed and configured to output fuel received from the second sorbent bed.

2. The sorbent bed assembly of claim 1, wherein at least one of the plurality of sorbent beds comprises a desulfurizer material.

3. The sorbent bed assembly of claim 1, wherein the fuel inlet connector and the fuel outlet connectors are configured to be connected to and disconnected from external conduits using a quick-connect coupling.

4. The sorbent bed assembly of claim 1, wherein two or more of the sorbent beds comprise different types of sorbent materials from one another.

5. The sorbent bed assembly of claim 1, wherein the plurality of sorbent beds are supported on a pallet comprising side rails that extend from sides of the pallet.

6. The sorbent bed assembly of claim 5, wherein the side rails are configured to mate with a pallet jack.

7. The sorbent bed assembly of claim 1, wherein the sorbent beds each comprise internal channels filled with one or more sorbent materials.

8. The sorbent bed assembly of claim 1, wherein the plurality of sorbent beds are supported on a wheeled pallet.

9. A fuel cell system comprising:
a fuel cell stack; and
the sorbent bed assembly of claim 1 operatively connected to the fuel cell stack.

10. A fuel processor for a power generating system comprising one or more fuel cells, the fuel processor comprising:
a housing;
a first sorbent bed assembly of claim 1 disposed in the housing;
a second sorbent bed assembly of claim 1 disposed in the housing, wherein the first and second sorbent bed assemblies are individually removable from the housing;
an inlet manifold coupled to a fuel source;
an outlet manifold coupled to at least one fuel cell of the power generating system; and
at least one valve operable to selectively provide at least a first fuel flow state in which fuel from the inlet manifold flows through the first sorbent bed assembly and into the outlet manifold and fuel does not flow through the second sorbent bed assembly, and a second fuel flow state in which fuel from the inlet manifold flows through the second sorbent bed assembly and into the outlet manifold and fuel does not flow through the first sorbent assembly.

11. The fuel processor of claim 10, wherein the at least one valve is operable to selectively provide a third fuel flow state in which fuel from the inlet manifold flows through the first sorbent bed assembly and the second sorbent bed assembly into the outlet manifold, and a fourth flow state in which fuel from the inlet manifold does not flow through either the first sorbent bed assembly and the second sorbent bed assembly into the outlet manifold.

12. The fuel processor of claim 10, wherein the at least one valve comprises a manually or automatically-actuated ball valve and the first and second sorbent bed assemblies each comprise a desulfurizer.

13. The fuel processor of claim 10, further comprising:
at least one-sensor configured to detect a fuel flow state of the fuel processor; and
an alarm system configured to provide an indication that one or more of the first and second sorbent bed assemblies are ready to be removed from the fuel processor based on data from the at least one sensor.

14. The fuel processor of claim 10, further comprising:
a detector in fluid communication with an outlet of at least one of the first and second sorbent bed assemblies and configured to detect for the presence of unwanted contaminants in the fuel flow stream, wherein in response to detecting the presence of unwanted contaminants in fuel from a particular sorbent bed assembly, the fuel processor is configured to perform at least one of:
modifying a fuel flow state such that fuel does not flow through the particular sorbent bed assembly; and
initiating an alarm indicating that the particular sorbent bed assembly requires servicing.

* * * * *